US012358104B2

(12) United States Patent
Schneider et al.

(10) Patent No.: US 12,358,104 B2
(45) Date of Patent: Jul. 15, 2025

(54) SCREWDRIVER WITH EXTENDABLE SHAFT AND BIT STORAGE

(71) Applicant: Milwaukee Electric Tool Corporation, Brookfield, WI (US)

(72) Inventors: Joshua D. Schneider, Grayslake, IL (US); Colin J. Roberts, Brookfield, WI (US); Scott M. Hangartner, Hartland, WI (US); George Barton, Mequon, WI (US); Cheng Zhang Li, Sussex, WI (US); Kai-Wen Cheng, Taichung (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 460 days.

(21) Appl. No.: 17/827,000

(22) Filed: May 27, 2022

(65) Prior Publication Data

US 2022/0379443 A1 Dec. 1, 2022

Related U.S. Application Data

(63) Continuation of application No. PCT/US2022/031053, filed on May 26, 2022.
(Continued)

(51) Int. Cl.
*B25B 15/04* (2006.01)
*B25G 1/08* (2006.01)

(52) U.S. Cl.
CPC .............. *B25B 15/04* (2013.01); *B25G 1/085* (2013.01)

(58) Field of Classification Search
CPC ................................ B25G 1/085; B25B 15/04
(Continued)

(56) References Cited

U.S. PATENT DOCUMENTS 2,720,296 A 10/1955 Briglia
4,102,375 A 7/1978 Rossini
(Continued)

FOREIGN PATENT DOCUMENTS

CN 2291997 9/1998
CN 201950617 8/2011
(Continued)

OTHER PUBLICATIONS

International Search Report and Written Opinion for International Application No. PCT/US2022/031053 dated Sep. 14, 2002, 11 pages.
(Continued)

*Primary Examiner* — Hadi Shakeri
(74) *Attorney, Agent, or Firm* — Reinhart Boerner Van Deuren s.c.

(57) ABSTRACT

A screwdriver includes a shank, a ratchet assembly, and a handle. The shank includes a shank extender that in an extended position lengthens the shank and in a retracted position is stored within the handle of the screwdriver. The ratchet assembly includes a knob and is configured to drive in the same direction the knob is turned. The screwdriver includes a locking mechanism to prevent unwanted movement of the shank between the extended and retracted positions. The handle of the screwdriver includes a storage space to hold alternative screwdriver bits and a stabilizing component to decrease movement of the handle when the storage portion is in an extended or open position. In a closed position the handle surrounds the alternate bits and in an open position the alternate bits are exposed.

20 Claims, 24 Drawing Sheets

Related U.S. Application Data

(60) Provisional application No. 63/194,020, filed on May 27, 2021, provisional application No. 63/286,944, filed on Dec. 7, 2021.

(58) Field of Classification Search
USPC .......................................................... 81/63.1
See application file for complete search history.

(56) References Cited

U.S. PATENT DOCUMENTS

| | | | |
|---|---|---|---|
| 4,290,328 A | 9/1981 | Clark | |
| 4,703,677 A | 11/1987 | Rossini | |
| 4,926,721 A | 5/1990 | Hsiao | |
| 5,309,798 A | 5/1994 | Markwart et al. | |
| 5,481,949 A | 1/1996 | Yen | |
| 5,533,429 A | 7/1996 | Kozak | |
| 5,664,312 A | 9/1997 | Sasaki et al. | |
| 5,687,820 A | 11/1997 | Lin | |
| 5,964,132 A | 10/1999 | Chen | |
| 6,260,446 B1 | 7/2001 | Hu | |
| 6,305,248 B1 | 10/2001 | Rowlay | |
| 6,418,821 B1 | 7/2002 | Yamakawa | |
| 6,510,768 B2 * | 1/2003 | Fruhm | B25F 5/029 81/177.4 |
| 6,511,268 B1 | 1/2003 | Vasudeva et al. | |
| 6,520,509 B1 | 2/2003 | Vasudeva et al. | |
| 6,644,147 B1 * | 11/2003 | Huang | B25B 13/468 81/58.4 |
| 6,658,970 B2 | 12/2003 | Shiao | |
| 6,817,458 B1 | 11/2004 | Gauthier | |
| 6,851,344 B1 | 2/2005 | Wade | |
| 6,883,406 B2 | 4/2005 | Yang | |
| 6,901,826 B2 | 6/2005 | Huang | |
| 6,916,106 B2 | 7/2005 | Xingguo | |
| 6,928,908 B1 | 8/2005 | Yu | |
| 6,948,605 B1 | 9/2005 | Gauthier | |
| 6,951,154 B2 | 10/2005 | Hsien | |
| 6,997,084 B1 | 2/2006 | Gao et al. | |
| 7,107,876 B1 | 9/2006 | Chen | |
| 7,131,358 B2 | 11/2006 | Hsien | |
| 7,137,320 B2 | 11/2006 | Tuan-Mu | |
| 7,156,216 B2 | 1/2007 | Gauthier | |
| 7,237,458 B2 | 7/2007 | Shiao | |
| 7,258,046 B2 | 8/2007 | Fruhm et al. | |
| 7,287,448 B2 * | 10/2007 | Hu | B25B 13/463 81/62 |
| 7,413,065 B2 | 8/2008 | Gauthier | |
| 7,421,772 B2 | 9/2008 | Gao et al. | |
| 7,430,945 B2 | 10/2008 | Gauthier et al. | |
| 7,434,493 B2 | 10/2008 | Huang | |
| 7,806,026 B2 | 10/2010 | Gauthier | |
| 7,913,594 B2 | 3/2011 | Gauthier et al. | |
| 8,037,790 B2 | 10/2011 | Gauthier | |
| 8,307,741 B2 | 11/2012 | Alvarez | |
| 8,522,651 B2 * | 9/2013 | Xu | B25B 13/463 81/62 |
| 8,833,214 B2 | 9/2014 | Wang | |
| 9,032,847 B2 | 5/2015 | Duitsman et al. | |
| 9,156,147 B2 | 10/2015 | Peters et al. | |
| 9,186,781 B2 | 11/2015 | Wang | |
| 9,227,309 B2 | 1/2016 | Moss et al. | |
| 9,278,435 B2 | 3/2016 | Tsai | |
| 9,358,671 B2 | 6/2016 | Lin | |
| 9,427,861 B2 | 8/2016 | Reynolds | |
| 9,463,558 B2 | 10/2016 | Yang | |
| 9,505,108 B2 | 11/2016 | Peters | |
| 9,844,861 B2 | 12/2017 | Wang | |
| 9,943,946 B2 | 4/2018 | Peters et al. | |
| 10,040,179 B2 | 8/2018 | Peters et al. | |
| 10,150,205 B2 | 12/2018 | Santamarina et al. | |
| 10,183,383 B2 | 1/2019 | Lai | |
| 10,384,334 B2 | 8/2019 | Tsai et al. | |
| 10,556,329 B2 | 2/2020 | Peters et al. | |
| 10,766,125 B2 | 9/2020 | Tsai et al. | |
| 2002/0184979 A1 | 12/2002 | Fruhm | |
| 2004/0040420 A1 | 3/2004 | Dierolf | |
| 2004/0089109 A1 | 5/2004 | Chen | |
| 2005/0011319 A1 | 1/2005 | Cho | |
| 2005/0092141 A1 | 5/2005 | Cho | |
| 2006/0027057 A1 | 2/2006 | Hsien | |
| 2006/0107801 A1 | 5/2006 | Hsien | |
| 2006/0123957 A1 | 6/2006 | Hsien | |
| 2006/0130621 A1 | 6/2006 | Novak et al. | |
| 2007/0000356 A1 | 1/2007 | Staples | |
| 2007/0012142 A1 | 1/2007 | Shiao | |
| 2007/0186730 A1 | 8/2007 | Chen | |
| 2008/0216610 A1 | 9/2008 | Hsieh | |
| 2008/0216616 A1 | 9/2008 | Hsieh | |
| 2008/0243134 A1 | 10/2008 | Limberg et al. | |
| 2008/0295650 A1 | 12/2008 | Hsieh | |
| 2008/0295653 A1 | 12/2008 | Hsieh | |
| 2008/0308376 A1 | 12/2008 | Gauthier | |
| 2009/0165606 A1 | 7/2009 | Hsien | |
| 2010/0116097 A1 | 5/2010 | Xu | |
| 2012/0031239 A1 | 2/2012 | Hu et al. | |
| 2017/0348832 A1 | 12/2017 | Yang | |
| 2018/0065231 A1 | 3/2018 | Wang | |
| 2019/0118357 A1 | 4/2019 | Huang | |
| 2019/0329387 A1 | 10/2019 | Chen | |
| 2020/0338697 A1 * | 10/2020 | Ge | B25B 15/04 |
| 2021/0187705 A1 | 6/2021 | Chung | |
| 2021/0276166 A1 | 9/2021 | Chen | |
| 2021/0323126 A1 | 10/2021 | Chuang | |

FOREIGN PATENT DOCUMENTS

| | | |
|---|---|---|
| CN | 101767319 | 12/2012 |
| CN | 202780966 | 3/2013 |
| CN | 102785206 | 10/2015 |
| CN | 205148179 | 4/2016 |
| CN | 109623708 | 4/2019 |
| CN | 109732523 | 5/2019 |
| CN | 209380626 | 9/2019 |
| CN | 209648568 | 11/2019 |
| CN | 111791170 | 10/2020 |
| DE | 202006013226 | 11/2006 |
| DE | 102010018656 | 11/2011 |
| DE | 102010037372 | 3/2012 |
| DE | 202012100244 | 7/2012 |
| DE | 202016104862 | 10/2016 |
| DE | 102015006327 | 11/2016 |
| DE | 202019105267 | 11/2019 |
| DE | 102020106267 | 9/2021 |
| WO | WO0117736 | 3/2001 |
| WO | WO03053635 | 7/2003 |
| WO | WO2008018865 | 2/2008 |

OTHER PUBLICATIONS

U.S. Appl. No. 17/511,524, filed Oct. 26, 2021, Lin.

* cited by examiner

SCREWDRIVER WITH EXTENDABLE SHAFT AND BIT STORAGE

CROSS-REFERENCE TO RELATED PATENT APPLICATIONS

The present application is a continuation of International Application No. PCT/US2022/031053, filed on May 26, 2022, which claims the benefit of and priority to U.S. Provisional Application No. 63/286,944, filed on Dec. 7, 2021, and U.S. Provisional Application No. 63/194,020, filed on May 27, 2021, which are incorporated herein by reference in their entireties.

BACKGROUND OF THE INVENTION

The present invention relates generally to the field of tools. The present invention relates specifically to a screwdriver having an extendable shaft and a handle with storage for multiple alternate bits.

SUMMARY OF THE INVENTION

One embodiment of the invention relates to a driving tool including a handle, a shank, and a ratchet assembly. The handle including a first end, a second end opposing the first end and a body portion configured to hold a plurality of tool bits. The shank is coupled to the handle and includes a first end and a second end. The shank extending along a longitudinal axis extending from the first end of the shank to the second end of the shank. The ratchet assembly includes a knob, the knob including a first cam structure and a second cam structure, a gear including a plurality of gear teeth, the gear coupled to the shank and a pawl housing at least partially received within the first end of the handle. The ratchet assembly further including a first pawl and a second pawl each positioned within the pawl housing and including a plurality of pawl teeth facing the gear. The knob is rotatable about the longitudinal axis and when the knob is in a locked position, the ratchet assembly is locked such that the shank does not rotate. When the knob is turned from the locked position in a clockwise direction to a first unlocked position, the ratchet assembly allows the shank to rotate in a clockwise position. When the knob is turned in a clockwise direction to a second unlocked position, the ratchet assembly allows the shank to rotate in the counterclockwise direction.

Another embodiment of the invention relates to a screwdriver including a handle, a shank, and a ratchet assembly. The handle including a first end, a second end opposing the first end and a body portion configured to hold a plurality of tool bits. The shank is coupled to the handle and includes a first end and a second end, the second end of the shank includes a bore. The ratchet assembly is positioned between the first end of the shank and the second end of the shank and includes a pawl housing at least partially received within the first end of the handle and a switch coupled to the handle. The switch includes a first cam structure and a second cam structure, the first and second cam structures extending downward toward the pawl housing. The ratchet assembly further including a gear, a first pawl and a second pawl. The gear includes a plurality of teeth and is coupled to the shank. The first pawl and second pawl are each positioned within the pawl housing and include a plurality of pawl teeth configured to engage the gear teeth of the gear. The first cam structure is configured to engage the first pawl and the second cam structure is configured to engage the second pawl.

Another embodiment of the invention relates to a driving tool including a handle, a shank, and a ratchet assembly. The handle including a first end, a second end opposing the first end and a body portion configured to hold a plurality of tool bits. The shank is coupled to the handle and includes a first end and a second end. The shank extends along a longitudinal axis extending from the first end of the shank to the second end of the shank. The ratchet assembly is positioned between the first end of the shank and the second end of the shank and includes a switch coupled to the handle, the switch including a cam structure and a gear including a plurality of gear teeth, the gear coupled to the shank. The ratchet assembly further includes a pawl housing including a recess and a bore, the bore extending along the longitudinal axis, the pawl housing at least partially received within the first end of the handle. The ratchet assembly includes a first pawl and a second pawl each positioned within the recess of the pawl housing, the first pawl and the second pawl each include a plurality of pawl teeth, the plurality of pawl teeth configured to engage the gear teeth and an upper pawl body extending toward the switch, the upper pawl body including a pawl cam surface. The switch is rotatable about the longitudinal axis and the cam structure of the switch extends toward the pawl housing such that when the switch rotates about the longitudinal axis, the cam structure moves to interface with the pawl cam surface of the first pawl or the second pawl.

Another embodiment of the invention relates to a screwdriver including a shank, a ratchet assembly, a handle and an end cap coupled to the handle. The shank includes a first end, a second end, and an extended body portion. The first end of the shank includes a bore that removably supports a tool bit (e.g., Phillips-head, flat head, etc.). In a specific embodiment, the shank can be coupled to the handle in a first position where a large portion (e.g. at least 50% of the length) of the extended body portion of the shank extends from the handle such that the tool bit is supported at a first distance from the handle, and the shank can also be coupled to the handle in a second position where a small portion (e.g. less than 50% of the length) of the extended body portion of the shank extends from the handle such that the tool bit is supported at a second distance from the handle that is less than the first distance. In specific embodiments the shank can be moved from the increased length of the first position into the second, retracted position where the second end of the shank is received within the handle. An internal locking mechanism positioned within the handle prevents the shank from unwanted movement once it is placed in the extended or retracted position.

Another embodiment of the invention relates to a screwdriver including a shank, a ratchet assembly, a handle and an end cap coupled to the handle. The handle is constructed to provide a covered storage area to hold alternate, additional, or spare tool bits. The Handle includes a bore that surrounds a neck portion that sildably moves between a first, closed position where the alternate bits are enclosed within the handle and a second, open position where the alternate bits are available for access by the user. The neck of the handle includes a plurality of bit holders. The bit holders contain openings sized to hold alternate bits. In a specific embodiment, the handle and neck are sized to include a single grouping of alternate bits. In another specific embodiment, the handle and neck are sized to include two groupings of alternate bits.

Another embodiment of the invention relates to a screwdriver with a stabilizing component coupled to the neck of the handle. When the handle is in the open position, the stabilizing component engages an inner surface that defines the bore. The engagement between the inner surface of the bore and stabilizing component decreases movement of the handle when extended. In a specific embodiment, the stabilizing component includes a plurality of arms with radially outward facing surfaces configured to engage with the inner surface of the bore. In specific embodiments, radially outward facing surfaces of the arms provide a friction fit against the inner surface of the bore, and in such embodiments, the arms may be formed to provide a radially outward biasing force to provide for this engagement.

Another embodiment of the invention relates to a driving tool, such as a screwdriver, with a ratcheting assembly. The ratcheting assembly includes a knob, a pawl housing, a first pawl, a second pawl and a gear. The ratchet assembly is positioned between the first end of the shank and the second end of the shank. The gear is coupled to shank. The first pawl and second pawl are positioned within the pawl housing and below the knob. When a user turns the knob in a first direction, a first cam structure of the knob moves the first pawl away from the gear such that the first pawl is disengaged, allowing the shank to rotate in the first direction. When the user turns the knob in a second direction, a second cam structure opposing the first cam structure moves the second pawl away from the gear, such that the second pawl is disengaged, allowing the shank to rotate in the second direction.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a screwdriver are shown. As discussed herein, Applicant has developed a number of improvements to the functionality of a screwdriver. To allow for more efficient completion of projects, the screwdriver includes a shank that can be coupled to the handle in a first position where a large portion of the extended body portion extends from the handle allowing greater reach. The extended body portion can be coupled to the handle in a second position where a small portion of the extended body portion extends from the handle, allowing use of the same screwdriver in a tighter or smaller space. Further, the screwdriver handle is built to include a covered storage area to hold alternate screwdriver bits. These alternate bits give a user the ability to work with more than one screw type (e.g. Phillips-head, flat head, etc.) using a single tool. Covered storage is particularly useful because it ensures the alternate bits do not fall out during use of the tool.

In various embodiments, Applicant has developed improvements to the stability of the extendable covered storage. In contrast to other covered storage that may become unstable when extended, a stabilizing component on the inner portion of the extendable handle decreases wobbling or instability when the handle is fully extended (e.g., storage portion is opened or uncovered). In a specific embodiment, the stabilizing component includes a plurality of spring arms to engage with the body of the tool around the end of the body such that amount of sway or wobble experienced by the extendable handle is reduced, better securing the alternate screwdriver bits held to the extendable handle.

In various embodiments, Applicant has improved the ratcheting mechanism of the tool. The ratcheting mechanism is more intuitive because when the switch or knob is turned in a direction, that direction is the driving direction of the ratchet mechanism (e.g., turn switch/knob clockwise then ratchet in clockwise direction). Further, Applicant believes the ratcheting mechanism design prevents accidental engagement or disengagement of the ratchet during use. For example, in design in which the driving direction and direction of the ratchet switch/knob are in opposite directions, a user operating the tool (particularly when wearing work gloves) may accidentally bump or turn the switch when applying torque to the handle which would cause the ratcheting mechanism to disengage or engage in the incorrect direction. Therefore, Applicant believes the ratcheting mechanism is easier to use and more efficient because a user should not need to stop to reposition the ratchet switch because of unintentional activation or disengagement of the switch.

Figure 1:
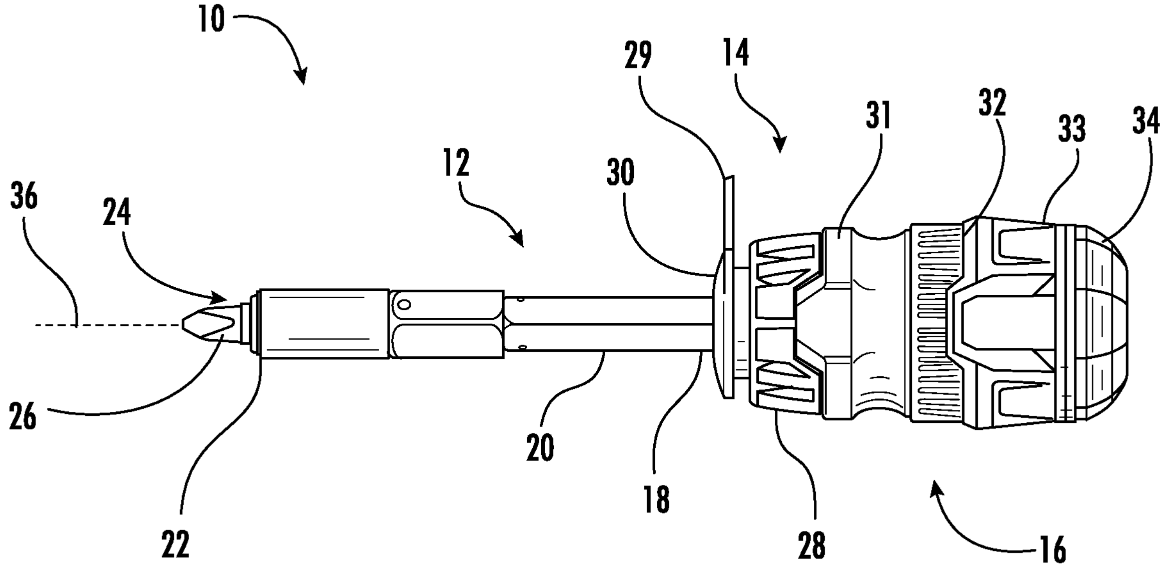
FIG. 1 is a side view of a screwdriver with a bit supporting shank in a first, extended position and a handle in a first, closed position, according to an exemplary embodiment.
Figure 2:
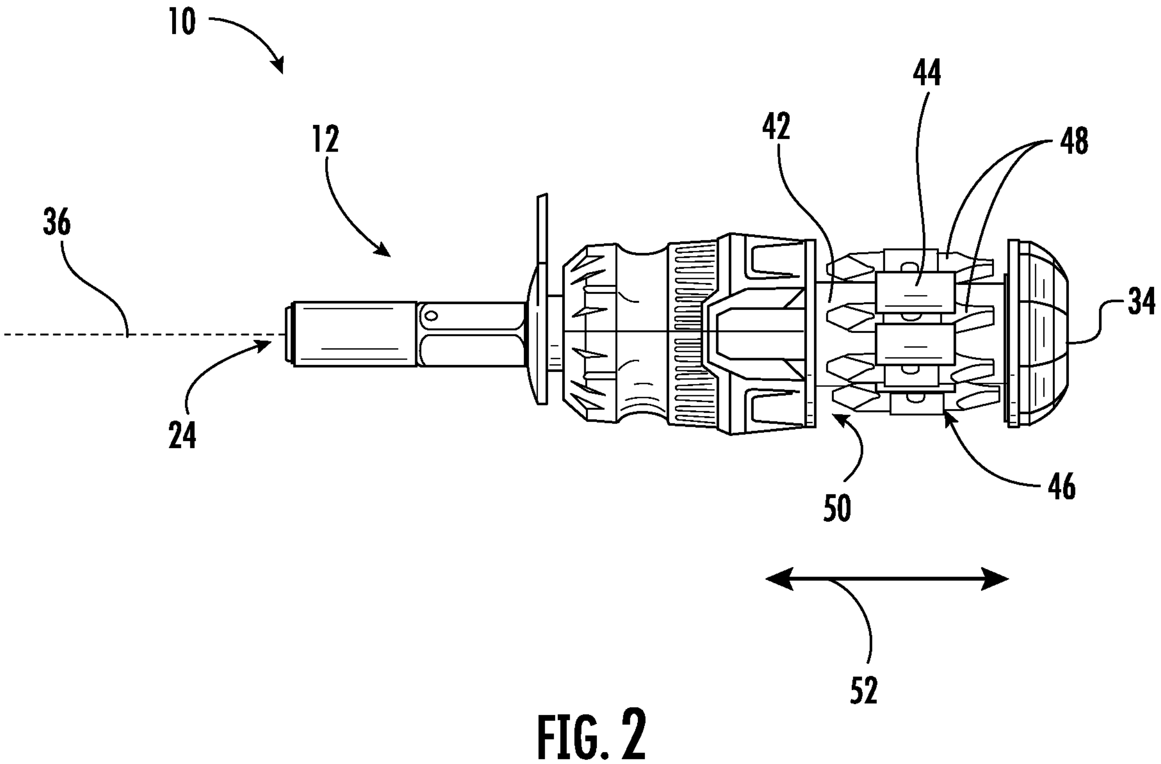
FIG. 2 is a side view of the screwdriver of FIG. 1 with the bit supporting shank in a second, retracted position and the handle in a second, open position, according to an exemplary embodiment.

Referring to FIGS. 1-2, various aspects of a tool, such as a driving tool, shown as screwdriver 10, are shown. Screwdriver 10 includes a shank 12, a ratchet assembly 14, a handle 16 and an end cap 34. The shank 12, includes a first end 22, a second end 18, and a bit supporting shank 20. A longitudinal axis 36 extends between the first end 22 of shank 12 and end cap 34. Bit supporting shank 20 is shown in a first, extended position and can be moved along the longitudinal axis 36 into handle 16 into a second, retracted position. An internal locking mechanism (see e.g. FIGS. 8 and 9) prevents the shank 12 from unwanted movement and allows the user to engage shank 12 at the selected desired length. The first end 22 includes a bore 24 that removably supports a bit 26. In a specific embodiment, bit 26 is retained within the bore 24 magnetically. In other embodiments, bit 26 can be retained by another mechanism (e.g. retaining clip, friction etc.). Ratchet assembly 14 includes a collar 30 positioned between the second end 18 of shank 12 and a ratchet switch 28. In one embodiment, ratchet switch 28 is rotatably coupled to handle 16.

Handle 16 is shown in a first, closed position. Handle 16 includes a body 32 with a first end 31 and a second end 33 opposing the first end 31. In one embodiment, first end 31 is proximate the ratchet switch 28. In another embodiment, the ratchet assembly 14 is positioned between shank 12 and first end 31 of the handle 16. Second end 33 is coupled to end cap 34. Body 32 is configured to store and/or hold extra tool bits. In a specific embodiment, handle 16 and cylindrical neck 42 are sized to hold a single grouping of alternate bits. In another specific embodiment, screwdriver 10 includes a lanyard attachment 29. Lanyard attachment 29 can spin about longitudinal axis 36 allowing screwdriver 10 to be tethered during use without becoming tangled with the lanyard. Lanyard attachment 29 is positioned between handle 16 the first end 22 of shank 12 such that it does not change the ergonomics of handle 16.

Referring to FIG. 2, screwdriver 10 is shown with the bit supporting shank 20 (not shown) in a second, retracted position and handle 16 in a second, open position. Arrow 52 shows the directions of movement for handle 16. Handle 16 sildably moves between the first, closed position and the second, open position. Handle 16 further includes an internal neck, shown as cylindrical neck 42, coupled to end cap 34. Cylindrical neck 42 includes a plurality of bit holders 44. Bit holders 44 contain openings 46 sized to hold alternate bits 48. Openings 46 receive alternate bits 48 and extend in a direction parallel to longitudinal axis 36 and are angularly spaced around cylindrical neck 42.

Handle body 32 includes a bore 50 extending along longitudinal axis 36. Body 32 surrounds cylindrical neck 42 and alternate bits 48 when handle 16 is in the first, closed position shown in FIG. 1. Cylindrical neck 42, bit holders 44, and alternate bits 48 are exposed when handle 16 is in the second, open position. When handle 16 is in the open position, a user can remove an alternate bit 48 from its corresponding bit holder 44 and place the bit in bore 24.

Figure 3:
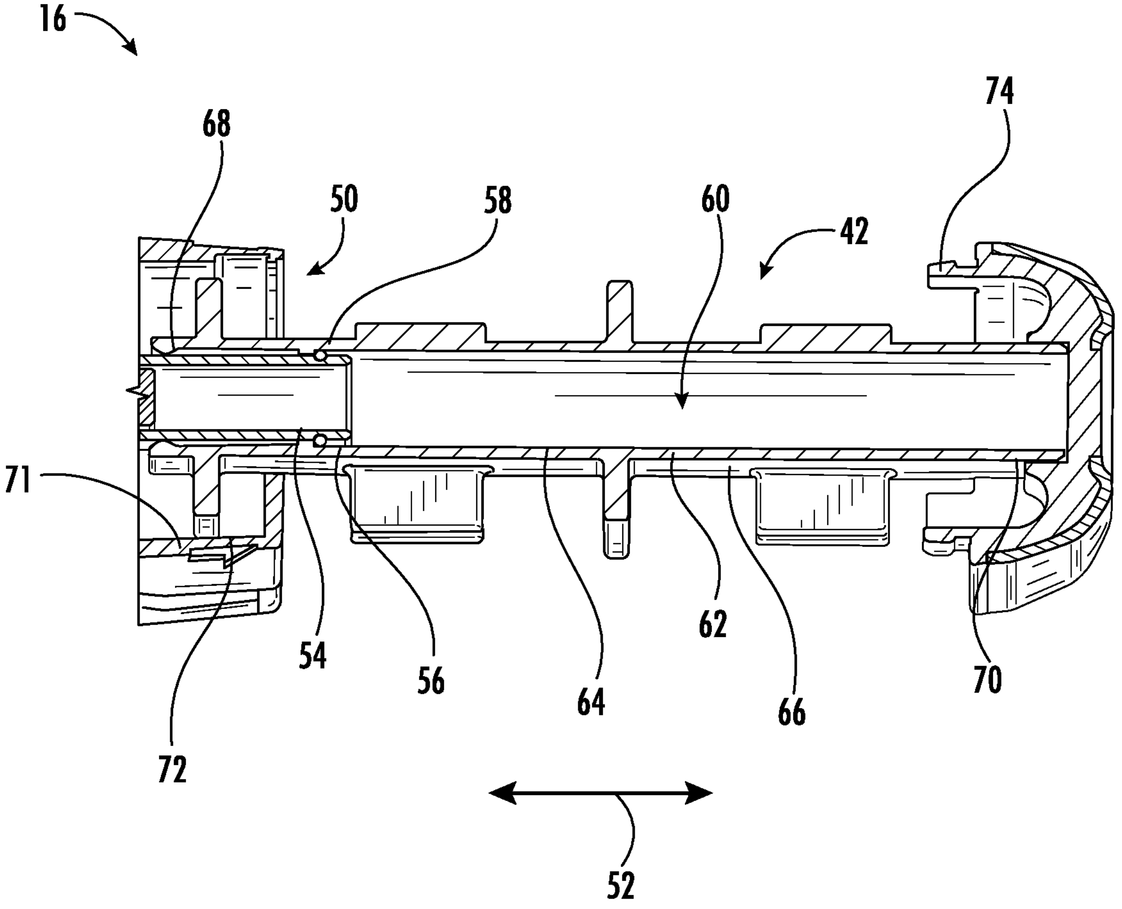
FIG. 3 is a cross-sectional view of the handle of FIG. 2, according to an exemplary embodiment.

Referring to FIG. 3, a cross-sectional view of handle 16 in the second, open position is shown. Cylindrical neck 42 further includes an inner channel 60. Inner channel 60 includes a channel wall 62 that has an inner surface 64 and an outer surface 66. Inner channel 60 surrounds a storage channel 54 that receives the second end 18 of shank 12 when it is in the retracted position. An outer surface 56 of storage channel 54 is held in place by clip 58.

The second end 33 of body 32 surrounds a first end 68 of cylindrical neck 42. A second end 70 of cylindrical neck 42 is coupled to end cap 34. The second end 33 further includes recesses 72 on an inner surface 71 of body 32. Recesses 72 are sized to receive projections 74 of end cap 34. In a specific embodiment, projections 74 keep handle 16 in a closed position.

Figure 4:
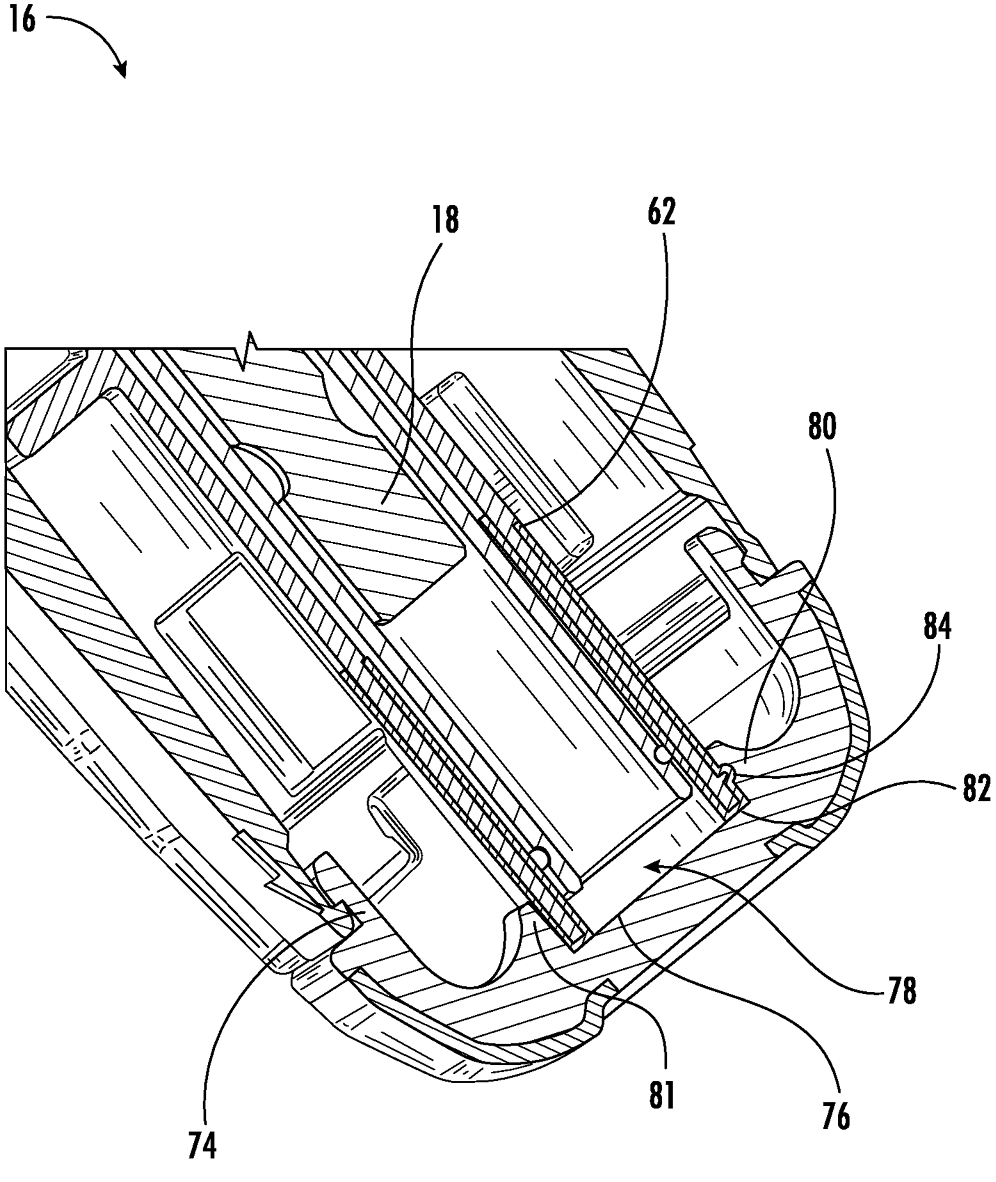
FIG. 4 is a perspective cross-sectional view of the screwdriver of FIG. 1 with the bit supporting shank in a retracted position and the handle in a closed position, according to an exemplary embodiment.

Referring to FIG. 4, a cross-sectional view of handle 16 in the first, closed position is shown. The second end 18 of shank 12 is received by storage channel 54 and held in place by a locking mechanism 170 (see e.g. FIG. 8) that will be described in greater detail below. End cap 34 further includes a recess 78 with an inner end wall 76 that extends between a pair of central projections 80, 81 on either side of recess 78. Recess 78 receives inner channel 60 and channel walls 62 and more specifically ends 82 of channel walls 62. Outer surface 66 of channel wall 62 includes a protrusion 84. Protrusion 84 snap fits to central projection 80 while the opposing channel wall 62 is press fit by inner end wall 76.

Figure 5:
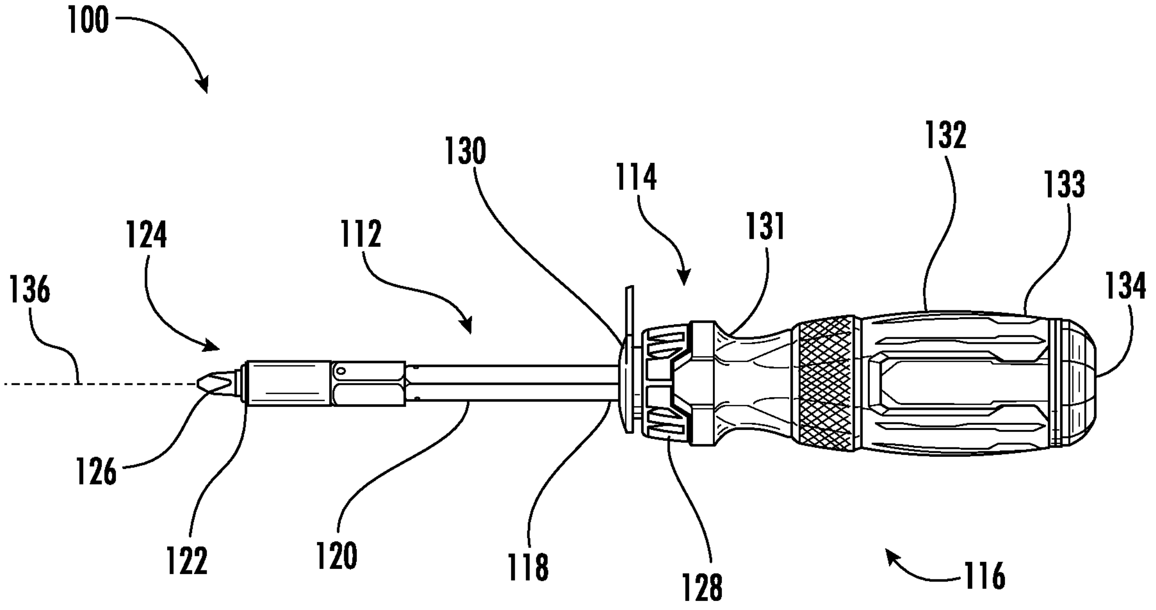
FIG. 5 is a side view of a screwdriver according to another embodiment, with a bit supporting shank in a first, extended position and a handle in a first, closed position, according to an exemplary embodiment.
Figure 6:
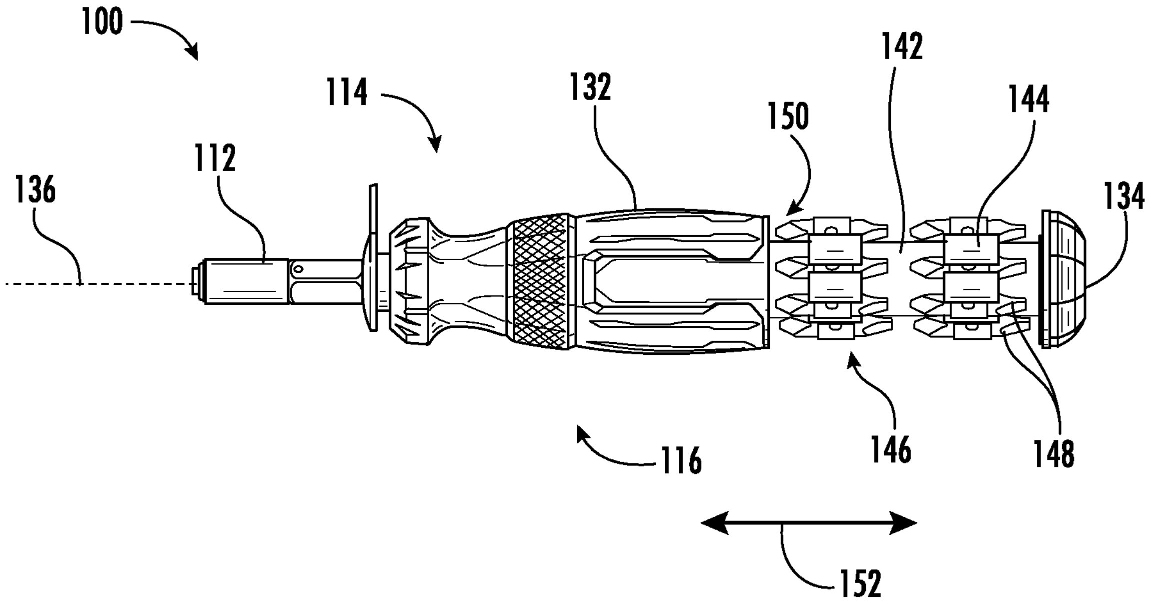
FIG. 6 is a side view of the screwdriver of FIG. 5 with the bit supporting shank in a second, retracted position and the handle in a second, open position, according to an exemplary embodiment.

Referring to FIGS. 5-6, various aspects of a tool, shown as screwdriver 100, are shown. In general, screwdriver 100 is substantially the same as screwdriver 10 except for the difference discussed herein. Handle 116 includes a body 132 and an internal neck, shown as cylindrical neck 142 with increased sizes relative to screwdriver 10. The increased size allows for an additional grouping of bit holders 144 around cylindrical neck 142 creating extra capacity for alternate bits 148. In another embodiment, the handle and neck may be sized to include more than two groupings of bit holders.

Figure 7:
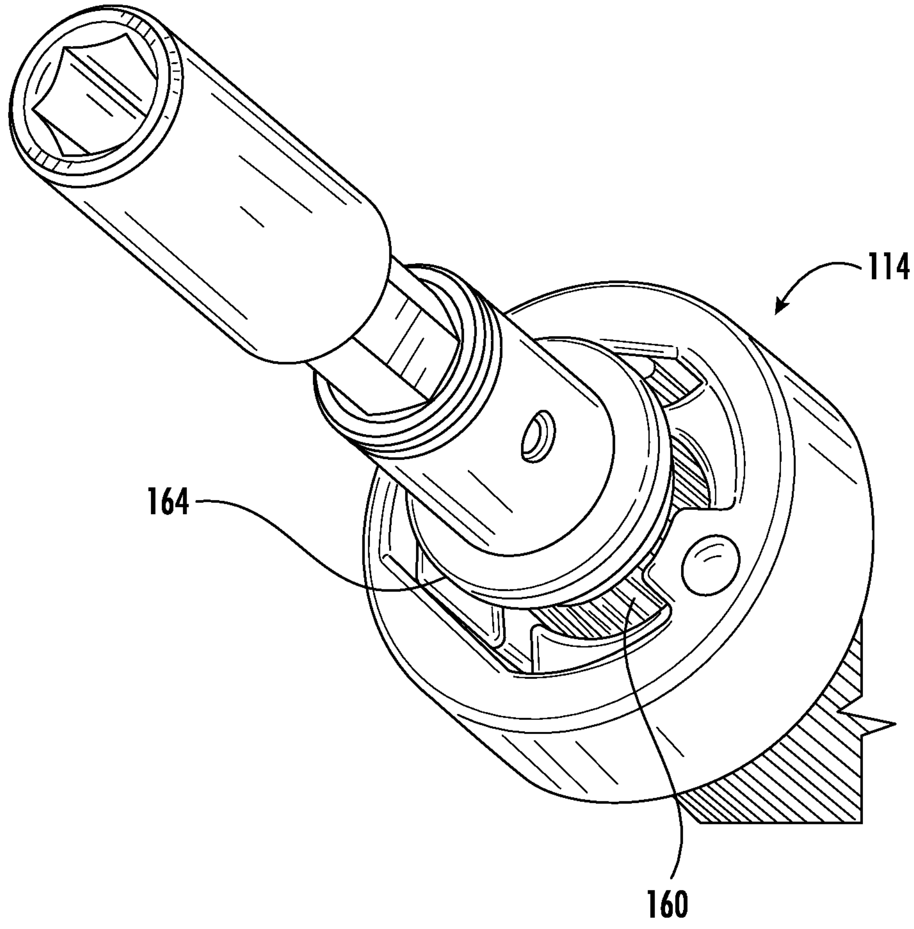
FIG. 7 is a perspective view of a ratchet assembly, according to an exemplary embodiment, according to an exemplary embodiment.
Figure 8:
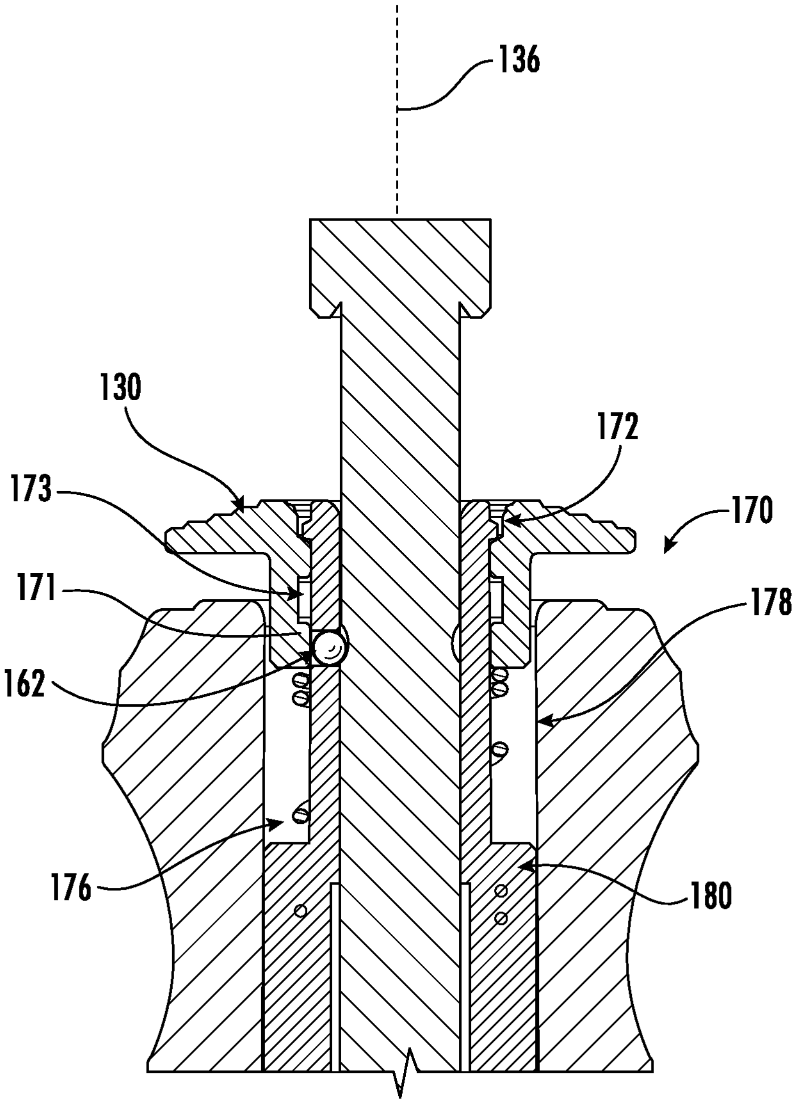
FIG. 8 is a cross-sectional view of a locking mechanism, according to an exemplary embodiment.
Figure 9:
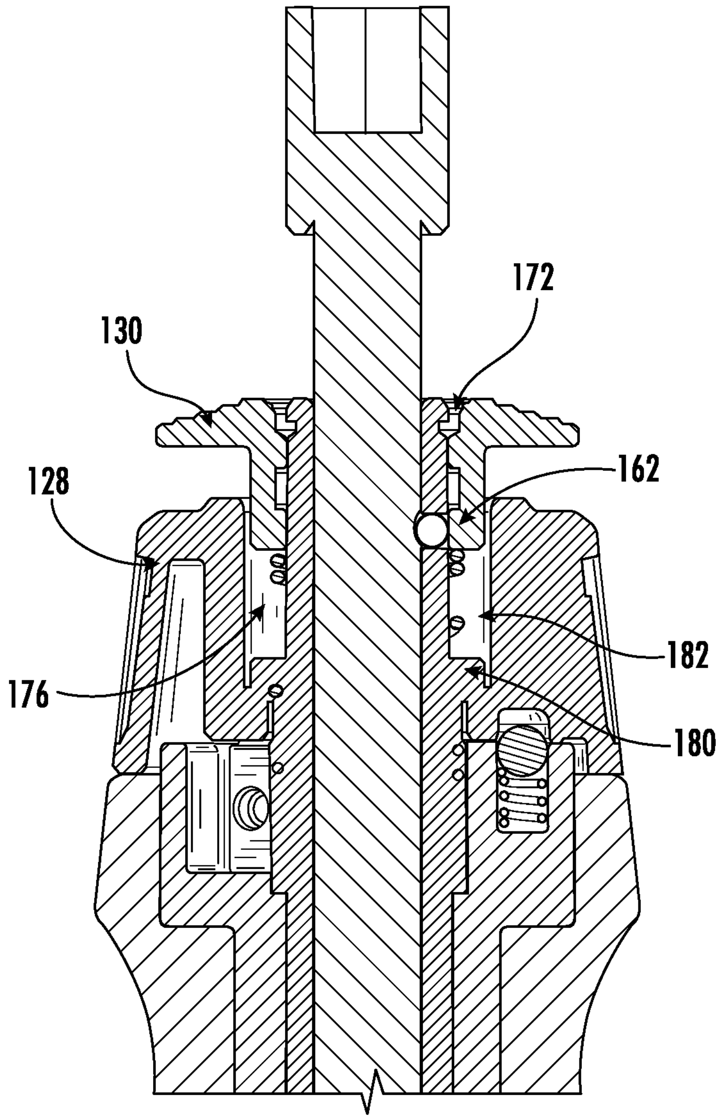
FIG. 9 is a cross-sectional view of a locking mechanism, according to an exemplary embodiment.

Referring to FIG. 7-9, various aspects of the ratchet assembly 114 and a locking mechanism 170 are shown. In general, ratchet assembly includes a gear wheel 160 and a pawl structure 164. Ratchet assembly 114, and specifically a switch 128 allows the user to change between clockwise and counterclockwise driving directions for bit 126. In general, locking mechanism 170 includes a collar 130, a ball 162, and a spring 176. Locking mechanism 170 prevents the shank 112 from unwanted movement once it is placed in the extended or retracted position. Collar 130 is held in place by a clip 172. In one embodiment, locking mechanism 170 includes a spring 176 positioned within a central recess 178 positioned at the first end 131 of body 132. Spring 176 is positioned between collar 130 and a wall 180 that prevents spring 176 from further movement into body 132. In another embodiment, locking mechanism 170 further includes a spring 176 positioned within a central recess 182 of a ratchet switch 128. Spring 176 is similarly positioned between collar 130 and a wall 180 that prevents spring 176 from further movement into body 132.

In a specific embodiment, when collar 130 is in a first, unpressed position, ball 162 is held against shank 12 and more specifically within a recess 171 to lock shank 12 in place. When collar 130 is in a second, pressed position a recess 173 on collar 130 is aligned with ball 162 such that ball 162 can move out of recess 171, allowing shank 12 to move within channel 54.

Figure 10:
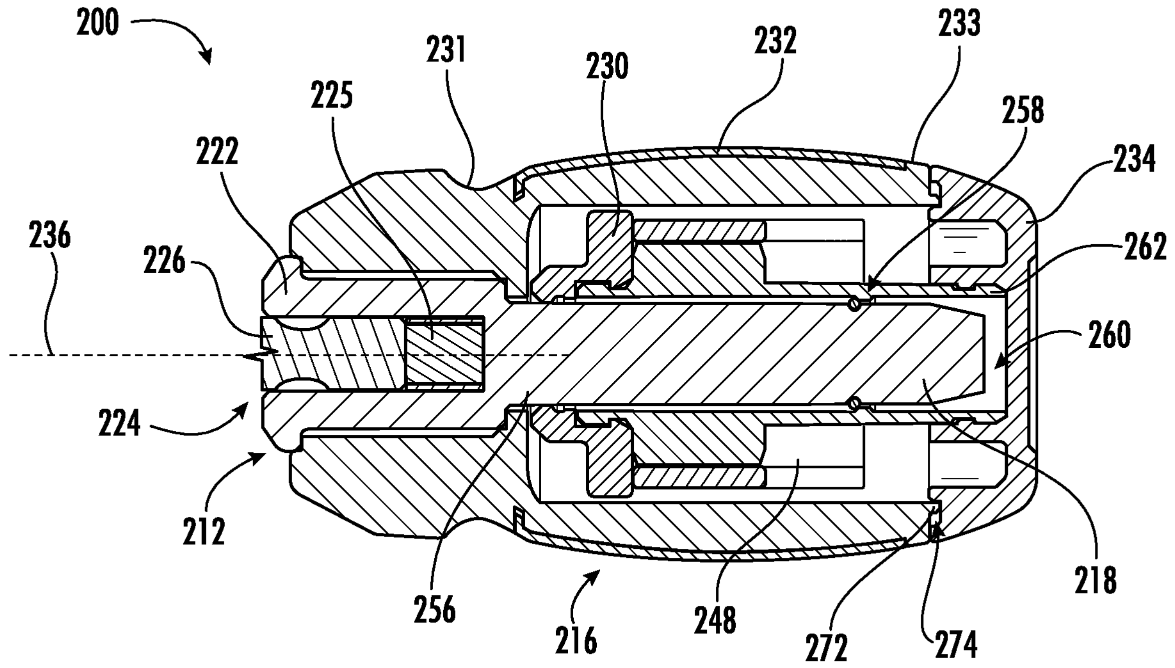
FIG. 10 is a cross-sectional view of a screwdriver with a handle in a first, closed position, according to another exemplary embodiment.
Figure 11:
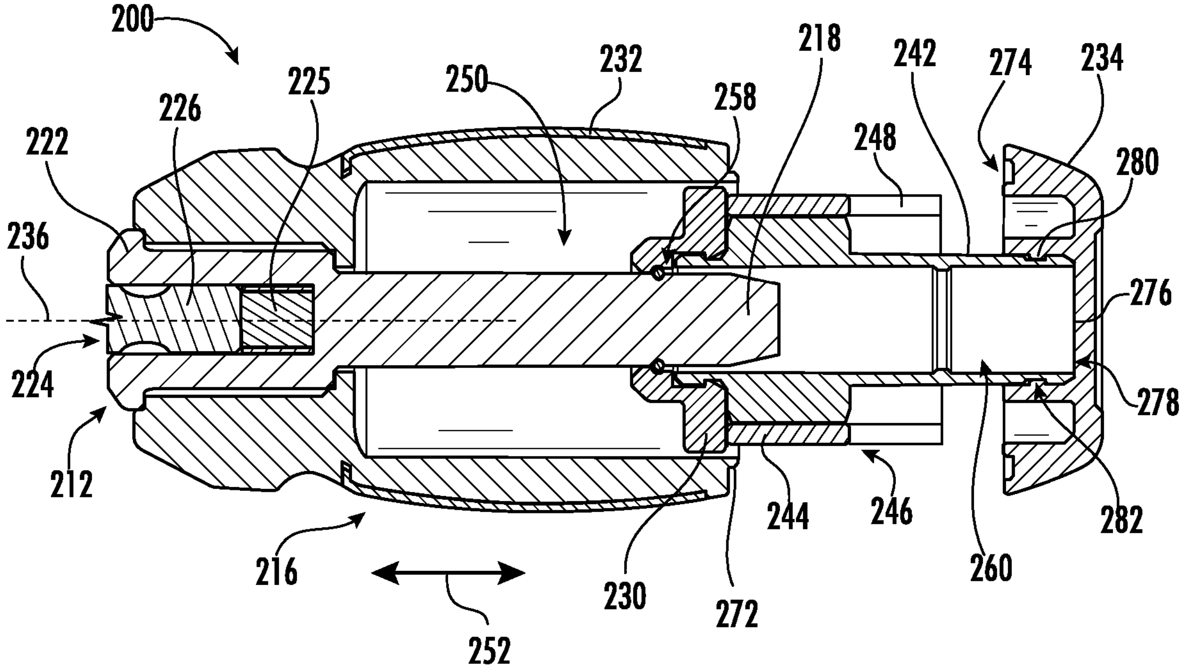
FIG. 11 is a cross-sectional view of the screwdriver of FIG. 10 with the handle in a second, open position, according to an exemplary embodiment.

Referring to FIGS. 10-11, various aspects of a driving tool, shown as screwdriver 200, are shown. In general, screwdriver 200 is substantially the same as screwdrivers 10 and 100 except for the difference discussed herein. Screwdriver 200 includes a shank 212, a handle 216 and an end cap 234. The shank 212 includes a first end 222 and a second end 218. A longitudinal axis 236 extends between the first end 222 of shank 212 and end cap 234. The first end 222 of shank 212 includes a bore 224 that removably supports a bit 226. In a specific embodiment, bit 226 is retained within the bore 224 by a magnetic component, shown as magnet 225. In other embodiments, bit 226 can be retained by another mechanism (e.g., retaining clip, friction etc.).

As shown in FIG. 10, handle 216 is shown in a first, closed position. Handle 216 includes a body 232 with a first end 231 and a second end 233. First end 231 is proximate the first end 222 of shank 212 and second end 233 is coupled to end cap 234. Body 232 is configured to store extra or alternate tool bits 248. In a specific embodiment, handle 216 is sized to hold a single grouping of alternate bits 248. In other embodiments, handle 216 may be sized to multiple groups of alternate bits (e.g., two, three groupings).

Referring to FIG. 11, screwdriver 200 is shown with handle 216 in a second, open position. Arrow 252 shows the directions of movement for handle 216. Handle 216 sildably moves between the first, closed position and the second, open position. Handle 216 further includes an internal neck, shown as cylindrical neck 242, coupled to end cap 234. Cylindrical neck 242 includes a plurality of bit holders 244. Bit holders 244 contain openings 246 sized to hold alternate bits 248. Openings 246 receive alternate bits 248 and extend in a direction parallel to longitudinal axis 236 and are angularly spaced around cylindrical neck 242.

Handle body 232 includes a bore 250 extending along longitudinal axis 236. Body 232 surrounds cylindrical neck 242 and alternate bits 248 when handle 216 is in the first, closed position (see e.g., FIG. 10). Cylindrical neck 242, bit holders 244, and alternate bits 248 are exposed and accessible to a user when handle 216 is in the second, open position. When handle 216 is in the open position, a user can remove an alternate bit 248 from its corresponding bit holder 244, place the bit in bore 224 and store the original bit 226 in the unoccupied bit holder 244.

When handle 216 is fully extended and cylindrical neck 242 is exposed, a stabilizing or anti-wobble component 230 engages with the second end 233 of body 232 to decrease and/or prevent cylindrical neck 242 from swaying in a manner that could loosen the alternate bits 248 stored on cylindrical neck 242. In a specific embodiment, the stabilizing component 230 may be a generally cylindrical component designed to allow for 360 degree engagement within bore 250. In other embodiments, the stabilizing component 230 may have a different shape and/or engage with the second end 233 of body 232 at discrete locations.

Cylindrical neck 242 further includes an inner channel 260. Inner channel 260 includes a channel wall 262 that surrounds the second end 218 of shank 212. An outer surface 256 of shank 212 is held in place by a clip, shown as a c-clip 258 within inner channel 260. The second end 233 of body 232 further includes an end cap wall 272. End cap wall 272 extends around the second end 233 of body 232 (e.g., wall is circular in shape). End cap wall 272 is sized to be received within a corresponding recess 274 of end cap 234. In a specific embodiment, the combination of end cap wall 272 and recess 274 keep handle 216 in a closed position.

End cap 234 further includes a recess 278 with an inner end wall 276 that extends between opposing sides of recess 278. Recess 278 receives inner channel 260 and channel walls 262 and more specifically ends 82 of channel walls 62. Channel wall 262 of cylindrical neck 242 includes a recess 282. Recess 282 extends around cylindrical neck 242. A cylindrical wall 280 of end cap 234 couples to recess 282 of the cylindrical neck 242.

Figure 12:
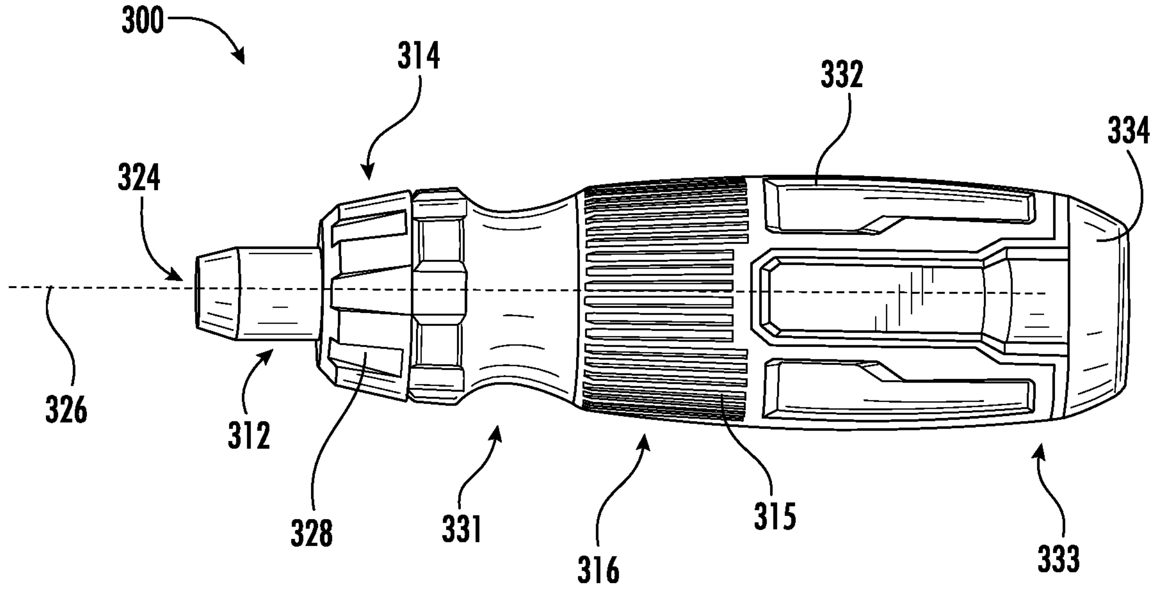
FIG. 12 is a side view of a screwdriver with a handle in a first, closed position, according to another exemplary embodiment.
Figure 13:
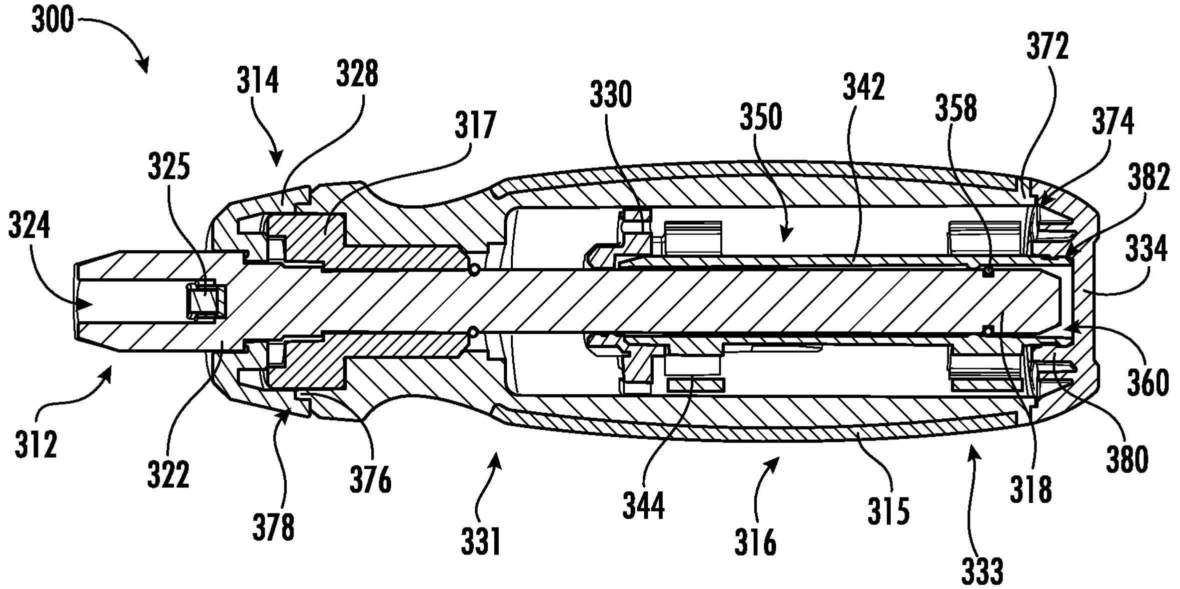
FIG. 13 is a cross-sectional view of the screwdriver of FIG. 12, according to an exemplary embodiment.

Referring to FIGS. 12-13, various aspects of a tool, shown as screwdriver 300, are shown. In general, screwdriver 300 may include the covered storage of screwdrivers, 10, 100 and discussed previously. Screwdriver 300 includes a shank 312, a ratchet assembly 314, a handle 316 and an end cap 334. The shank 312, includes a first end 322, a second end 318, A longitudinal axis 336 extends between the first end 322 of shank 312 and end cap 334. The first end 322 of shank 312 includes a bore 324 that removably supports a bit. In a specific embodiment, the bit is retained within the bore 324 by a magnetic component, shown as magnet 325.

Handle 316 includes a body 332 with a first end 331 and a second end 333. In one embodiment, first end 331 is proximate the first end 322 of shank 312. Second end 333 is coupled to end cap 334. Body 332 is configured to hold and/or store extra or alternate tool bits. In a specific embodiment, handle 316 is sized to hold two grouping of alternate bits. In other embodiments, handle 316 may be sized to hold a different number of groups of alternate bits (e.g., one, three groupings, etc.). Handle 316 further includes a grip portion 315 that extends at least partially around body 332. Grip portion 315 includes a plurality of ridges to improve the grip of a user on handle 316. In a specific embodiment, grip portion 315 is formed from a different material than the rest of handle 316 that provides friction (e.g., rubber).

As will be discussed in greater detail below, ratchet assembly 314 includes a switch or knob 328 and a pawl housing 317. Knob 328 includes a recess 378 configured to receive and rotatably couple to an annular wall 376 of handle 316. Annular wall 376 extends away from first end 331 and toward knob 328. Recess 378 receives annular wall 376 defining the rotating joint of knob 328.

Figure 14:
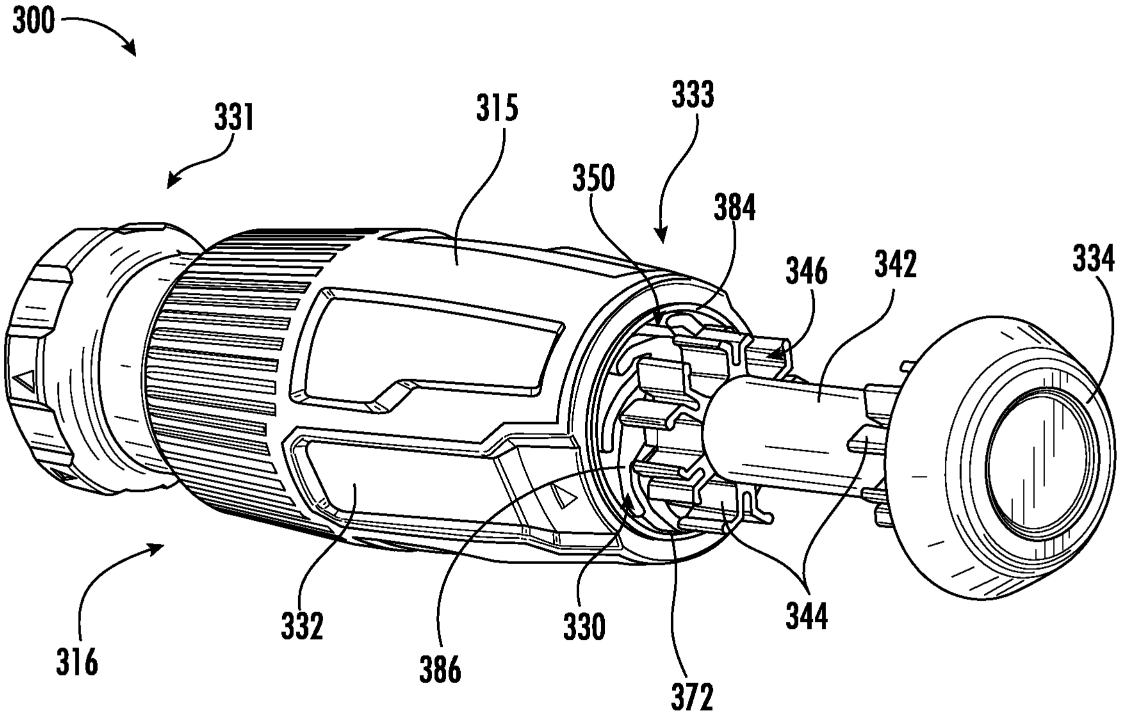
FIG. 14 is a rear side view of the screwdriver of FIG. 12 with the handle in a second, open position, according to an exemplary embodiment.
Figure 15:
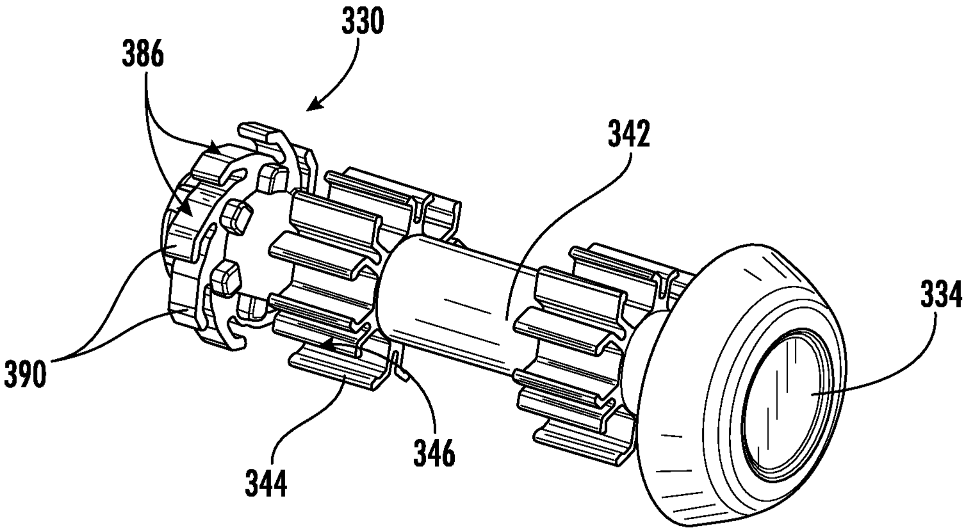
FIG. 15 is a detailed perspective view of a bit storage portion of the screwdriver handle of FIG. 12, according to an exemplary embodiment.

Referring to FIGS. 13-15, screwdriver 300 is shown with handle 316 in a first, closed position. Handle 316 is sildably moveable between the first, closed position and a second, open position. Handle 316 further includes an internal neck, shown as cylindrical neck 342, coupled to end cap 334. Cylindrical neck 342 includes a plurality of bit holders 344. Bit holders 344 contain openings 346 sized to hold alternate bits. Openings 346 receive alternate bits and extend in a direction parallel to longitudinal axis 336 and are angularly spaced around cylindrical neck 342. In a specific embodiment, openings 346 are hexagonal prisms.

Handle body 332 includes a bore 350 extending along longitudinal axis 336. Body 332 surrounds cylindrical neck 342 and alternate bits 348 when handle 316 is in the first, closed position (see e.g., FIG. 12). Cylindrical neck 342, bit holders 344, and the alternate bits are exposed and accessible to a user when handle 316 is in the second, open position.

When handle 316 is fully extended and cylindrical neck 342 is exposed, a stabilizing or anti-wobble component 330 engages with the second end 333 of body 332 to decrease and/or prevent cylindrical neck 342 from swaying or moving in a manner that could loosen the alternate bits stored on cylindrical neck 342. In other embodiments, the stabilizing component 330 may have a different shape and/or engage with the body 332 at more or fewer discrete locations.

In a specific embodiment, stabilizing component 330 includes a plurality of radial projections or spring arms 386. The plurality of spring arms 386 include a plurality of radially outward facing surfaces 390 to provide a friction fit against the bore 350. In such embodiments, the spring arms 386 may be formed to provide a radially outward biasing force to provide for this engagement. In a specific embodiment, the plurality of spring arms 386 are curved in a counterclockwise direction. In another embodiment, the plurality of spring arms 386 may be curved in a clockwise direction. In such an embodiment, the stabilizing component creates a friction fit as the user slides the covered storage portion of the handle into an open position, reducing wobble or undesired movement.

Figure 16:
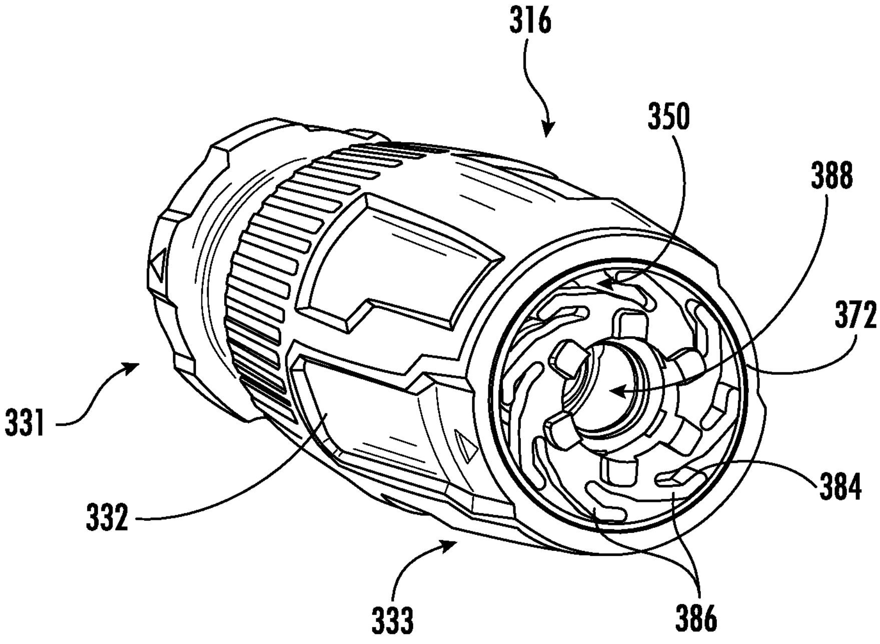
FIG. 16 is a detailed rear view of a stabilizing component of the screwdriver of FIG. 12, according to an exemplary embodiment.
Figure 17:
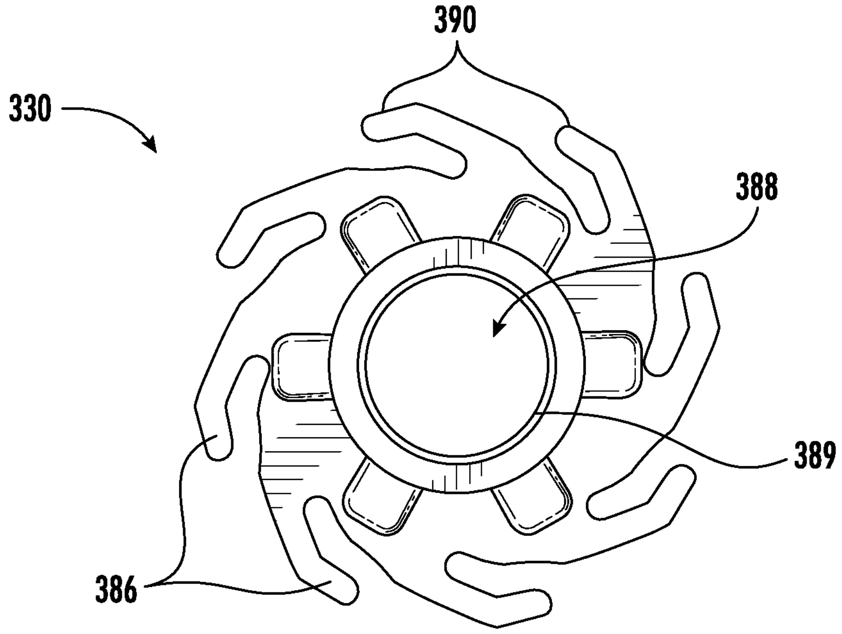
FIG. 17 is a plan view of the stabilizing component of the handle of the screwdriver of FIG. 12, according to an exemplary embodiment.

Referring to FIGS. 16-17, details of the stabilizing component 330 are shown, according to an exemplary embodiment. The plurality of spring arms 386 are biased outward toward an end cap wall 372 and specifically engage with an inner surface 384 of body 332 at the second end 333. The plurality of radially outward facing surfaces 390 (in the orientation of FIG. 15) engage with inner surface 384 to decrease the undesired movement or sway of cylindrical neck 342, end cap 334 and the other components of the covered storage (e.g., alternate bits etc.) when the cylindrical neck 342 is moving and fully extended as shown in FIG. 14. Stabilizing component 330 further includes a central opening 388 defined by a central wall 389. Central opening 388 is configured to receive and coupled to cylindrical neck 342 at an end distal from end cap 334.

Figure 18:
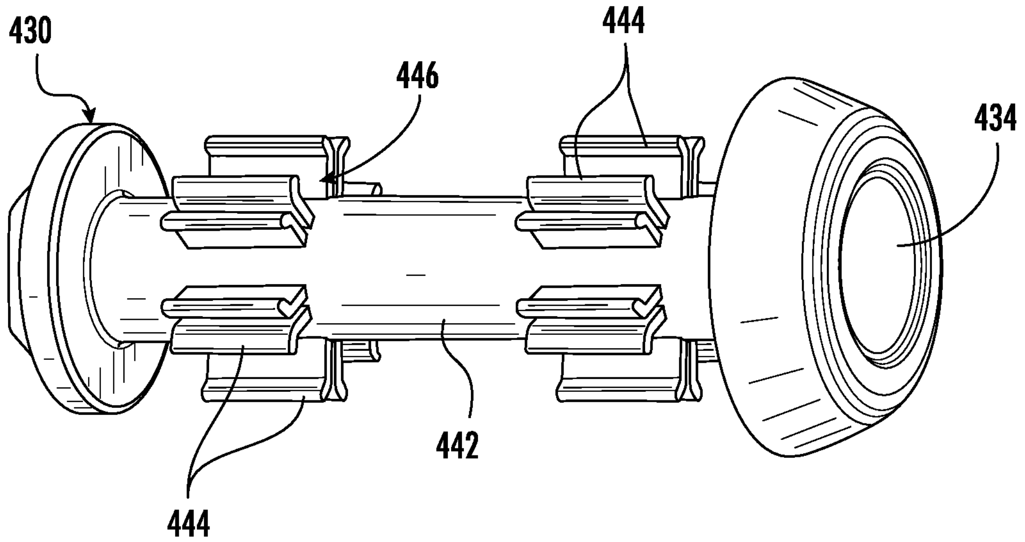
FIG. 18 is a detailed perspective view of a bit storage portion of a screwdriver handle, according to another exemplary embodiment.
Figure 19:
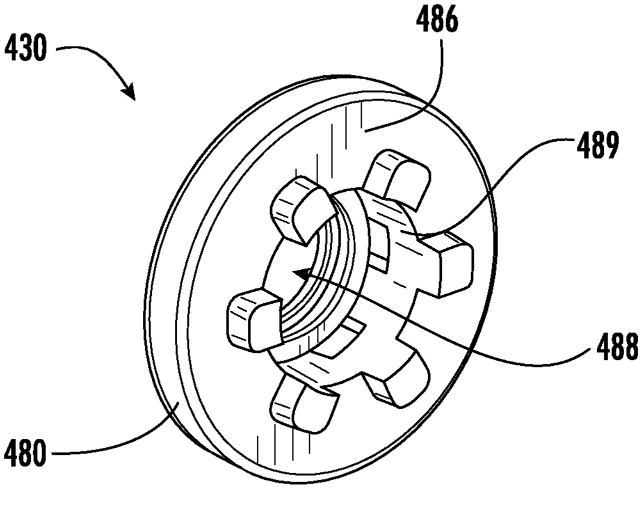
FIG. 19 is a detailed perspective view of a stabilizing component of a screwdriver handle, according to another exemplary embodiment.

Referring to FIGS. 18-19, details of another stabilizing component 430 that can be utilized with screwdriver 10, 100, 200, or 300 is shown according to an exemplary embodiment. In a specific embodiment, stabilizing component 430 has a generally cylindrical shape. The cylindrical shape of stabilizing component 430 provides more continuous contact with the inner surface of the body of the screwdriver. Further, the design of stabilizing component 430 may avoid potential tolerance issues be more cost efficient to manufacture than a stabilizing component with many arms.

Stabilizing component 430 includes an outward facing surface 480 that engages with inner surface of the screwdriver body to decrease the undesired movement or sway of cylindrical neck 442, end cap 434 and the other components of the covered storage (e.g., alternate bits etc.) when the cylindrical neck 442 sliding or in a fully extended position. Stabilizing component 430 further includes a central opening 488 at least partially defined by a central wall 489. Central opening 488 is configured to receive and coupled to cylindrical neck 442 at an end distal from end cap 434.

Figure 20:
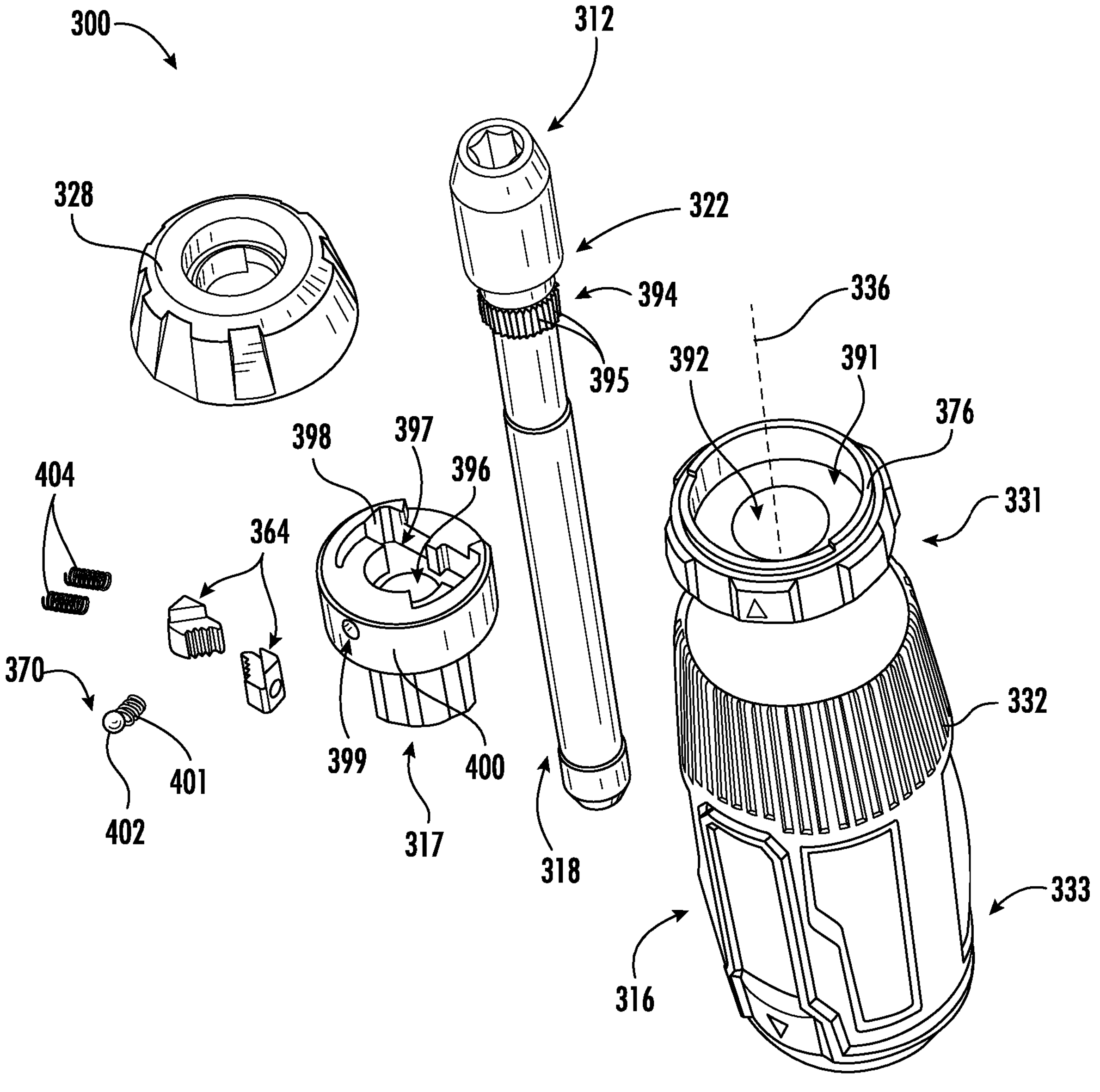
FIG. 20 is an exploded view of the screwdriver of FIG. 12, according to an exemplary embodiment.

Referring to FIG. 20, an exploded view of screwdriver 300 is shown, according to an exemplary embodiment. Handle 316 includes a recess 391 at first end 331. Recess 391 is configured to receive pawl housing 317. Handle 316 further includes an opening 392 extending along longitudinal axis 336 and through first end 331 of body 332 and connecting to bore 350 (see e.g., FIG. 13). When screwdriver 300 is assembled, shank 312 extends through opening 392 into bore 350 of handle 316.

Shank 312 further includes a gear 394 positioned between first end 322 and second end 318 of the shank 312. Gear 394 includes a plurality of gear teeth 395 extending around shank 312. Gear teeth 395 are radially outward facing on an outer surface of gear 394. Pawl housing 317 includes a pawl housing opening 396 extending along longitudinal axis 336 and through pawl housing 317. Pawl housing 317 is at least partially received within recess 391 and opening 392 such that pawl housing opening 396 is connected to opening 392 and bore 350 of handle 316. When screwdriver 300 is assembled, shank 312 extends through pawl housing opening 396 into bore 350 of handle 316 (see e.g., FIG. 13).

Pawl housing 317 includes a pair of pawl recesses 397. Each pawl recess 397 is sized and shaped to receive a pawl 364. Each pawl recess 397 includes a biasing surface 398. Each pawl 364 is coupled to a biasing component, shown as a spring 404. Springs 404 move each pawl 364 relative to their respective biasing surface 398 along a pawl translation axis 365 (see e.g., FIG. 23). Pawl housing 317 further includes an outer surface 400 that at least partially engages with recess 391 of handle 316. Outer surface 400 includes a bore 399. Bore 399 engages with locking mechanism 370 of the ratchet assembly 314. Locking mechanism 370 includes a biasing element, shown as spring 401 and a ball 402. Spring 401 is positioned within bore 399 of pawl housing 317. As knob 328 is turned, one of the knob recesses 412 receives ball 402 (see e.g., FIG. 21). An engagement surface 414 of each respective knob recess 412 may interface with ball 402 when the knob 328 is turned such that the respective knob recess 412 is in front of bore 399. When the ball 402 interfaces with the respective knob recess 412, the knob 328 resists rotation.

Figure 21:
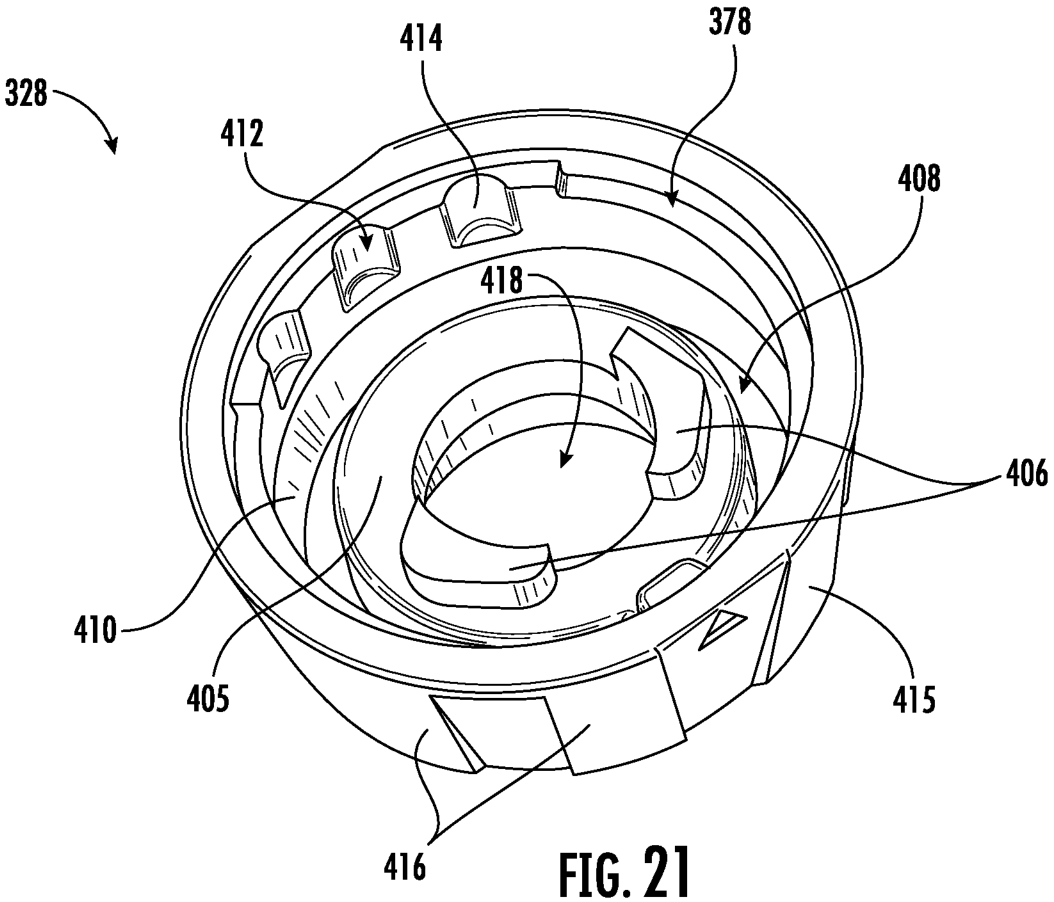
FIG. 21 is a perspective view from below of a ratchet knob of the screwdriver of FIG. 12, according to an exemplary embodiment.

Referring to FIG. 21, a detailed perspective views of ratchet knob 328 from below is shown, according to an exemplary embodiment. Ratchet knob 328 is rotatable about the longitudinal axis 336. Knob 328 includes an inward extending (in the orientation shown in FIG. 13) annular wall 405. A pair of cam structures 406 are coupled to annular wall 405 and extend further inward toward pawl housing 317. Knob 328 further includes a curved inner surface 410. An annular recess 408 is defined between curved inner surface 410 and annular wall 405. When assembled, at least a portion of pawl housing 317 is received within annular recess 408 (see e.g., FIG. 13) and shank 312 extends through a central opening 418 of knob 328. Knob 328 further includes an outward facing surface 415 (in the orientation shown in FIGS. 13 and 21). Outward facing surface 415 includes a plurality of projections or grips 416. Grips 416 of knob 328 help a user to manually turn knob 328.

Figure 22:
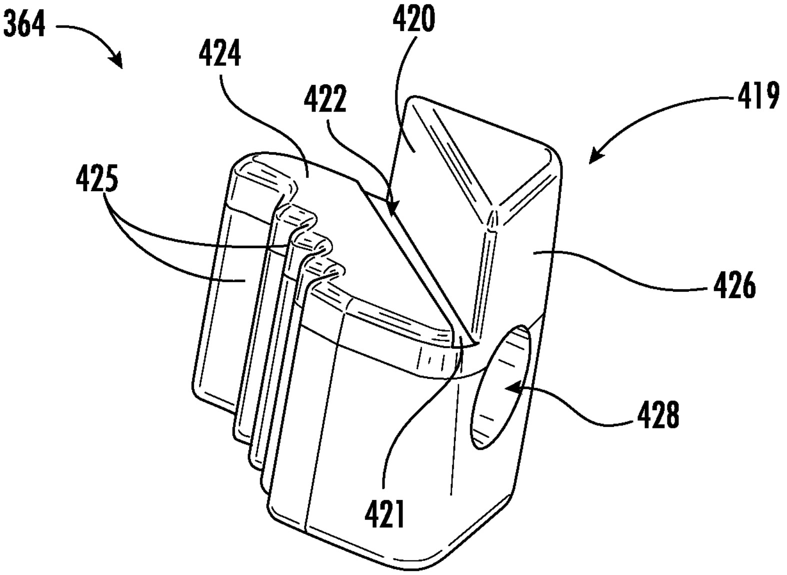
FIG. 22 is a perspective view of a pawl of the screwdriver of FIG. 12, according to an exemplary embodiment.

Referring to FIG. 22, a detailed perspective views of a pawl is shown, according to an exemplary embodiment. Ratchet assembly 314 includes a first pawl 364 and a second pawl 364 positioned within pawl housing 317 (see e.g., FIG. 20) that engage with a respective cam structure 406 of knob 328. Each pawl 364 includes an upper pawl body 419. The upper pawl body 419 includes a pawl cam surface 420. Pawl cam surface 420 faces inward (e.g., toward gear 394. Pawl 364 includes an opposing surface 421 with an orientation generally parallel to cam surface 420. A channel 422 is defined between pawl cam surface 420 and opposing surface 421. Each pawl 364 further includes a gliding surface 424 that cam structure 406 slides over while moving to interface with cam surface 420 of the first pawl 364 or the second pawl 364. Gliding surface 424 has a generally perpendicular (e.g., 90 degrees plus or minus 10 degrees) orientation relative to cam surface 420.

Each pawl 364 includes an angled side surface 426 that faces biasing surface 398 of pawl housing 317 when ratchet assembly 314 is assembled. Angled side surface 426 includes a biasing recess 428. Biasing recess 428 is sized to couple to spring 404 which can act to bias pawl 364. Each pawl 364 further includes a plurality of pawl teeth 425 extending in a generally parallel orientation to cam surface 420. Pawl teeth 425 are configured to engage with gear teeth 395 when the pawl 364 is positioned within pawl recess 397. Specifically, pawl teeth 425 extend radially inward to engage with the radially outward extending gear teeth 395 of gear 394.

Figure 23:
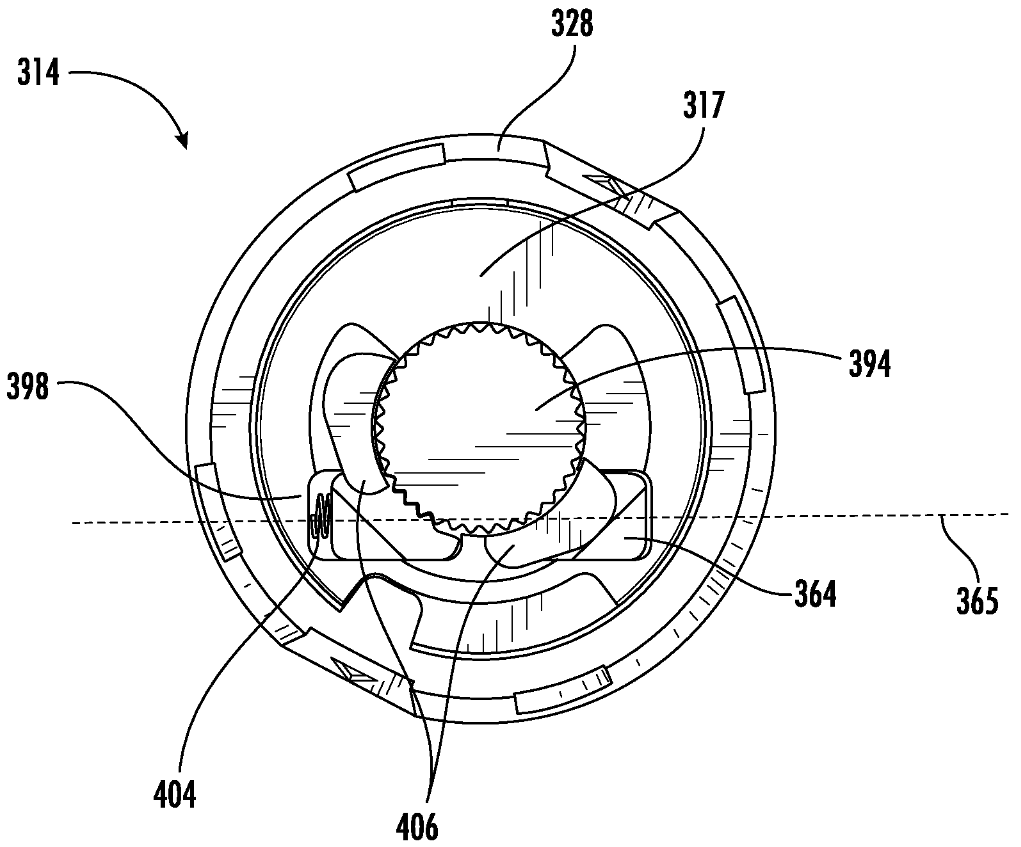
FIG. 23 is a cross-sectional view of a ratchet assembly of a screwdriver, according to an exemplary embodiment.

Referring to FIG. 23, a cross-sectional view of the ratchet assembly is shown, according to an exemplary embodiment. FIG. 23 shows knob 328 after a user has turned knob 328 to a clockwise position. When in the clockwise position, one of the cam structures 406 of knob 328 presses against the cam surface 420 of pawl 364 disengaging the pawl 364. Because the pawl 364 is disengaged, the pawl teeth 425 separated from gear teeth 395, allowing shank 312 to turn clockwise. When knob 328 is in a locked position, the first cam structure 406 is spaced from the first pawl 364 and the second cam structure 406 is spaced from the second pawl 364 such that the pawl teeth 425 are engaged with the gear teeth 395, locking the ratchet assembly 314 such that the shank (see e.g., 312 in FIG. 20) does not rotate. When the first cam structure 406 is spaced from the first pawl 364 and the second cam structure 406 is spaced from the second pawl 364, a gap is located between the respective cam surfaces 420 of each pawl 364 and the opposing surfaces of the first and second cam structures 406 such that the engagement surface of each cam structure 406 does not contact the opposing cam surface 420 of the first pawl 364 or second pawl 364.

Figure 24:
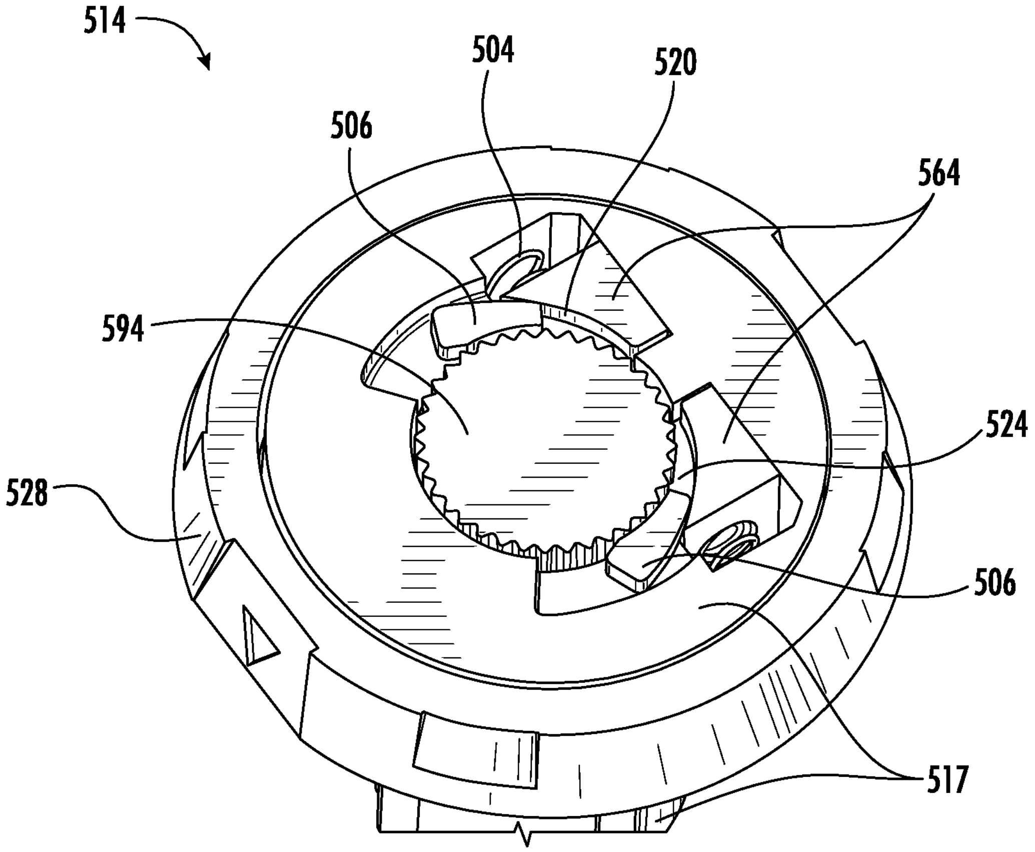
FIG. 24 is a cross-sectional view of a ratchet assembly of a screwdriver, according to another exemplary embodiment.

Referring to FIG. 24, a cross-sectional view of the ratchet assembly is shown, according to another exemplary embodiment. Ratchet assembly 514 is substantially the same as ratchet assembly 314 except for the differences discussed herein. In a specific embodiment, cam structures 506 have a continuous taper approaching pawls 564 and cam surfaces 520 are curved. In other embodiments, the cam structures may not have a continuous taper as they approach the pawls and the cam surface may be planar.

Figure 25:
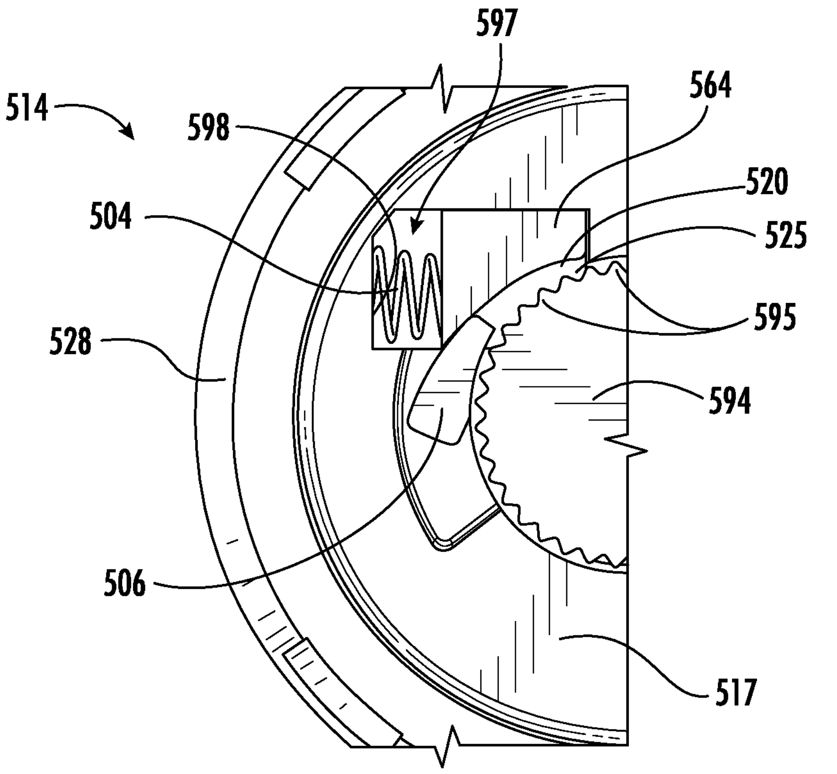
FIG. 25 is a plan view of the ratchet assembly of FIG. 24 showing a pawl in a first, engaged position, according to an exemplary embodiment.
Figure 26:
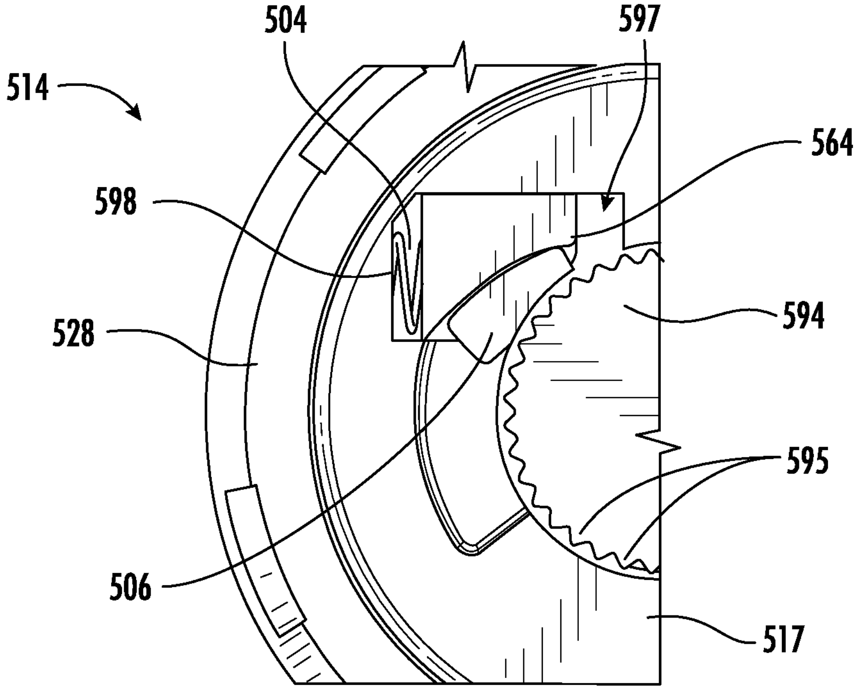
FIG. 26 is a plan view of the ratchet assembly of FIG. 21 showing the pawl in a second, disengaged position, according to an exemplary embodiment.

Referring to FIGS. 25-26, plan views showing a pawl moving from a first, engaged position to a second, disengaged position are shown, according to an exemplary embodiment. Referring to FIG. 25, when engaged, pawl 564 is positioned at an end of the pawl recess 597 opposing biasing surface 598 and spring 504 is extended. In the engaged position, the pawl teeth 525 are biased toward engagement with gear teeth 595 and knob 528 has not been turned to move cam structure 506 into engagement with cam surface 520.

Referring to FIG. 26, pawl 564 is shown in a disengaged position. When a user turns knob 528 (e.g., in first and/or a clockwise direction), cam structure 506 slides forward into engagement with cam surface 520, pushing pawl 564 within pawl recess 597 toward biasing surface 598 as spring 404 is compressed. As pawl 564 is moved, pawl teeth 525 become separated from gear teeth 595 such that pawl 564 is disengaged from gear 594. Because pawl 564 is disengaged, gear 594 and the shank are free to spin or turn (e.g., in first and/or clockwise direction).

When ball 402 of locking mechanism 370 is positioned within the middle or center knob recess 412, neither cam structure 406 is pressed against the pawls 364 or their pawl cam surfaces 320, meaning both sets of pawl teeth 425 are engaged with gear teeth 395 locking the ratchet assembly 314. As a user turns knob 328 in the clockwise direction, ball 402 becomes engaged with one of the outside knob recesses 412 and one of the cam structures 406 pushes against one pawl 364, meaning that one pawl 364 becomes disengaged allowing the gear and shank to turn in a clockwise direction. Similarly, when a user turns knob 328 in the counterclockwise direction, ball 402 becomes engaged with the opposing outside knob recess 412 and the other (opposite pawl of turning clockwise) pawl 364 becomes disengaged allowing the gear and shank to turn in a counterclockwise direction.

In contrast to other ratchet mechanisms that include pivoting pawls, the pawls 364 move in a nonpivoting, non-rotational or translational manner as the cam structures 406 engage with the pawls 364. Further, instead of biasing elements that are parallel to each other, springs 404 of the first and second pawls 364 are aligned (i.e., linear) with each other. Springs 404 define the pawl translation axis 365 (see e.g., FIG. 23). Pawl translation axis 365 extends in a perpendicular orientation relative to longitudinal axis 336 which is the central or rotational axis for gear 394 and ratchet assembly 314.

Figure 27:
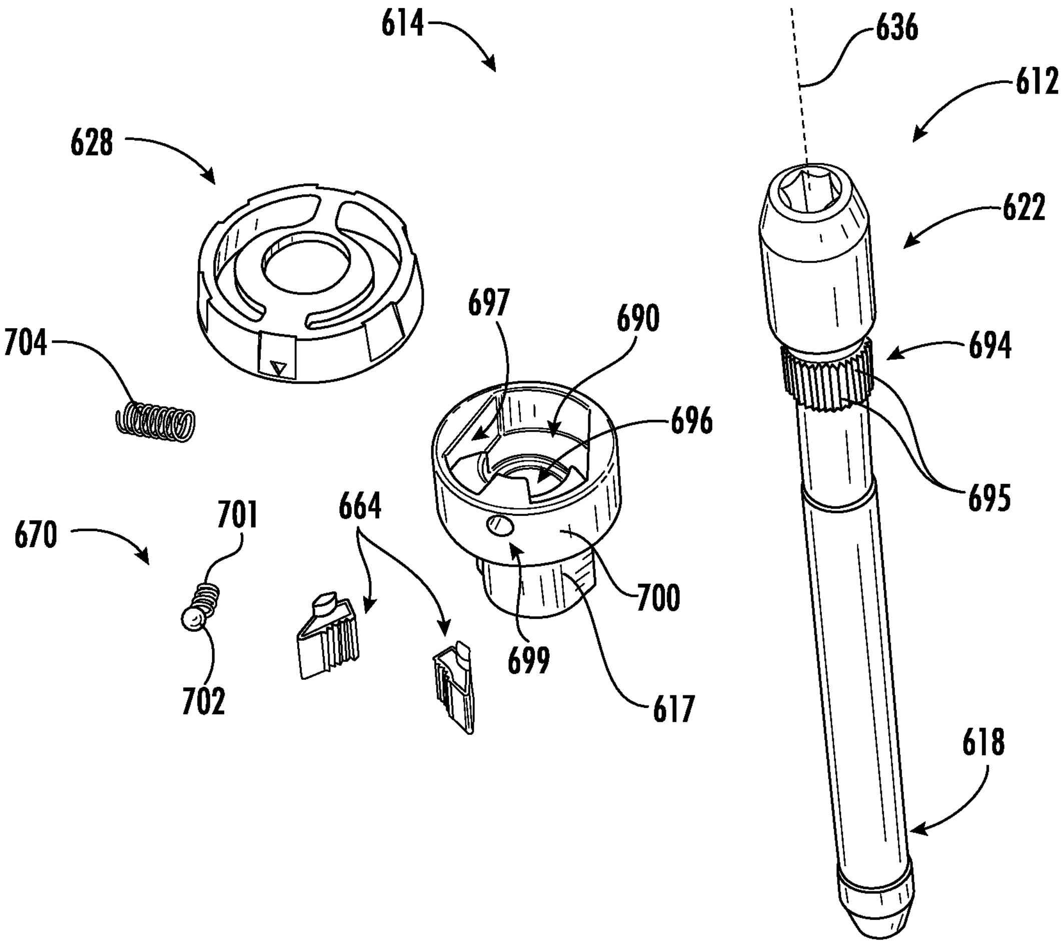
FIG. 27 is an exploded view of a ratchet assembly of a screwdriver, according to another exemplary embodiment.

Referring to FIG. 27, an exploded view of a ratchet assembly 614 that can be utilized with a screwdriver, such as screwdriver 300 is shown, according to an exemplary embodiment. Ratchet assembly 614 includes a switch or knob 628 and a pawl housing 617. Ratchet assembly 614 is substantially the same as ratchet assembly 314 and 514 except for the differences discussed herein. Knob 628 includes a recess 678 configured to receive and rotatably couple to an annular wall of the screwdriver handle (see e.g., FIG. 20). Recess 678 receives the annular wall of the handle and defines the rotating joint of knob 628.

When the screwdriver is assembled, a shank 612 extends along longitudinal axis 636 with at least a portion of shank 612 extending through pawl housing 617. Shank 612 further includes a gear 694 positioned between a first end 622 and second end 618 of the shank 612. Gear 694 includes a plurality of gear teeth 695 extending around shank 612. Pawl housing 617 includes a pawl housing opening 696 extending along longitudinal axis 636 and through pawl housing 617.

Pawl housing 617 includes a pair of pawl recesses portions 697 defined within a pawl housing recess 690. Pawl recesses portions 697 are positioned on opposing sides of pawl housing opening 696. Each pawl recess portion 697 is shaped to correspond to a pawl 664. Each pawl 664 is coupled to a biasing component, shown as a spring 704. Spring 704 is positioned within pawl housing recess 690 and extends between a first pawl 664 and a second pawl 664. Spring 704 moves each pawl 664 relative to their respective pawl recess portion 697 and the other pawl 664.

Pawl housing 617 further includes an outer surface 700 that includes a bore 699. Bore 699 engages with locking mechanism 670 of the ratchet assembly 614. Locking mechanism 670 includes a biasing element, shown as spring 701 and a ball 702. Spring 701 is positioned within bore 699 of pawl housing 617. As knob 628 is turned, one of the knob recesses 712 (see e.g., FIG. 28). receives ball 702. An inward facing (e.g., facing toward pawl housing 617) engagement surface 714 of each respective knob recess 712 interfaces with ball 702 when the knob 628 is turned such that the respective knob recess 712 is in front of bore 699. The ball 702 is positioned to engage with spring 701 on a first side and configured to engage with the knob recesses 712 on a second side such that when a knob recess 712 is positioned in front of the second side of the ball 702, the ball 702 engages the inward facing engagement surface 714 of the knob recess 712 to resist rotation of knob 628.

Figure 28:
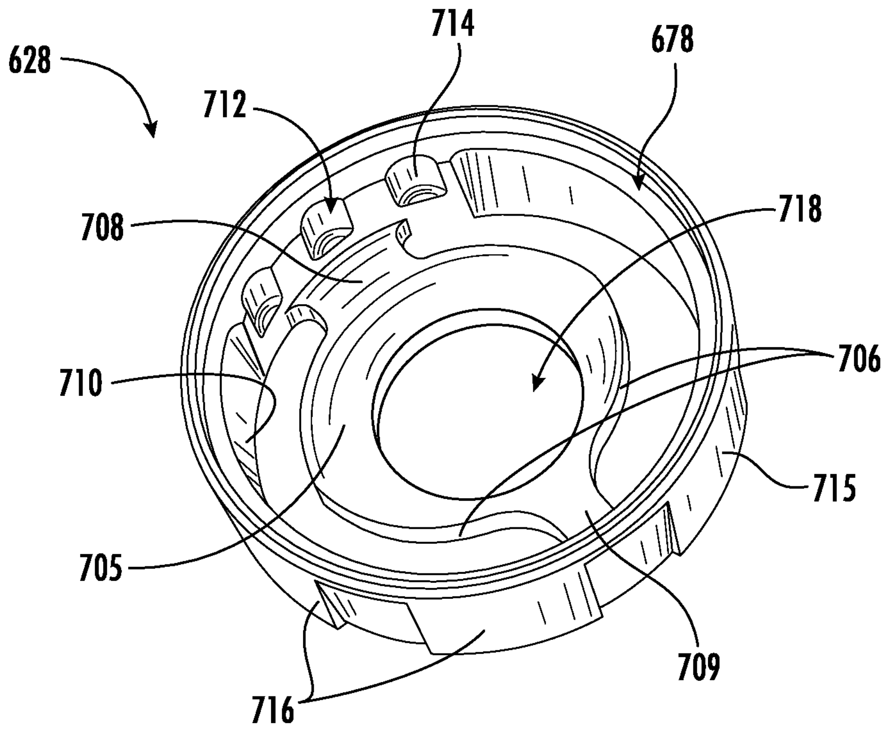
FIG. 28 is a perspective view from below of a ratchet knob of the ratchet assembly of FIG. 27, according to an exemplary embodiment.

Referring to FIG. 28, a detailed perspective views of ratchet knob 628 from below is shown, according to an exemplary embodiment. Knob 628 includes an inward extending (e.g., toward pawl housing 617) cam structure 705. Inward extending cam structure 705 includes a pair of cam surfaces 706. Knob 628 further includes a curved inner surface 710. Cam structure 705 is connected or coupled to curved inner surface 710 at a first position, adjacent to knob recesses 712 by a first connection portion 708. Cam structure 705 is connected or coupled to curved inner surface 710 at a second position opposing knob recesses 712 by a second connection portion 709. First connection portion 708 has a first width and second connection portion 709 has a second width. In a specific embodiment, the first width of first connection portion 708 is greater than the second width of second connection portion 709. When assembled, shank 612 extends through a central opening 718 of knob 628. Knob 628 further includes an outward facing surface 715. Outward facing surface 715 includes a plurality of projections or grips 716. Grips 716 of knob 628 help a user to manually turn knob 628.

Figure 29:
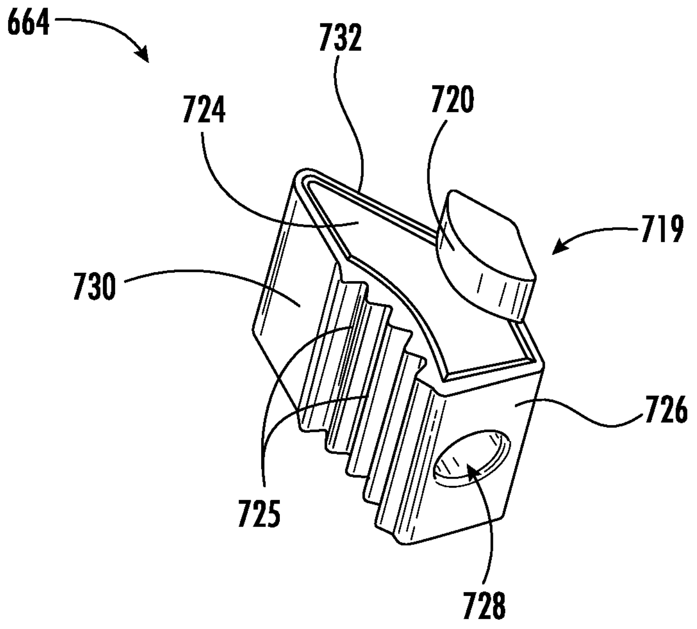
FIG. 29 is a perspective view of a pawl of the ratchet assembly of FIG. 27, according to an exemplary embodiment.

Referring to FIG. 29, a detailed perspective views of a pawl is shown, according to an exemplary embodiment. Ratchet assembly 614 includes first pawl 664 and second pawl 664 that engage with a respective cam surface 706 and/or cam structure 705 of knob 628. Each pawl 664 includes an upper pawl body 719. The upper pawl body 719 includes a pawl cam surface 720. Each pawl 664 further includes a gliding surface 724 that cam structure 705 slides over while moving to interface with cam surface 720. Gliding surface 724 has a generally perpendicular (e.g., 90 degrees plus or minus 10 degrees) orientation relative to cam surface 720.

Figure 30:
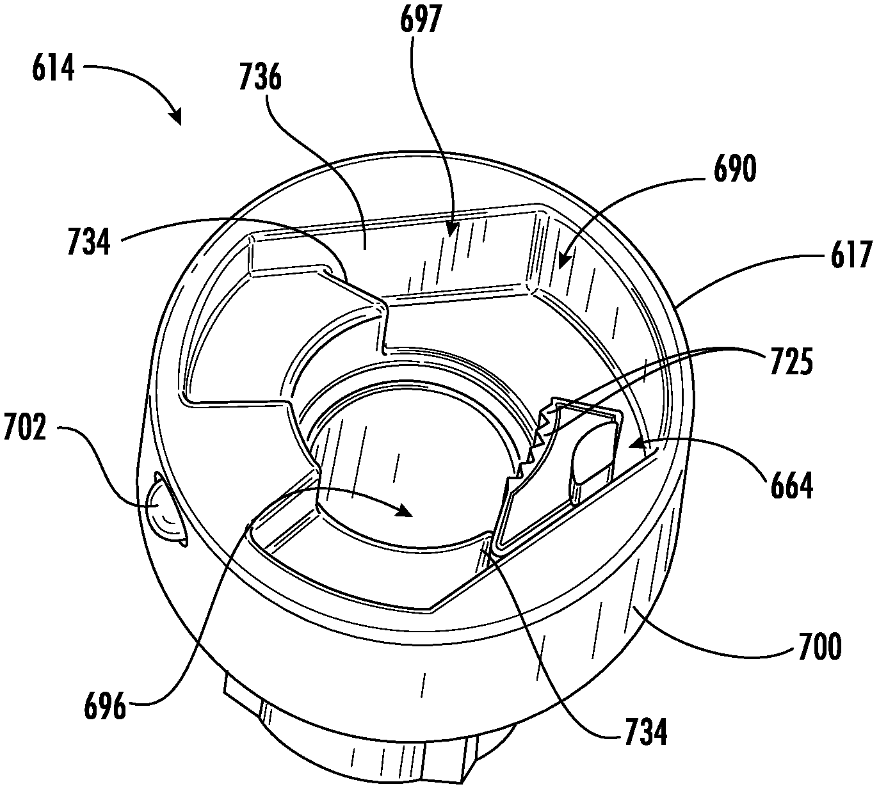
FIG. 30 is a perspective view of the ratchet assembly of FIG. 27, with the ratchet knob and a pawl removed, according to an exemplary embodiment.

Referring to FIGS. 29-30, each pawl 664 includes a side surface 726 that includes a biasing recess 728. Biasing recess 728 is sized to couple to spring 704 which can act to bias each pawl 664. Each pawl 664 further includes a plurality of pawl teeth 725 configured to engage with gear teeth 695 when the pawl 664 is positioned in an engagement position within pawl recess portion 697 pawl housing recess 690. Each pawl 664 includes a front side surface 730 is position on the same side of the pawl 664 as pawl teeth 725. Front side surface 730 at least partially faces and engages angled surface 734 of pawl housing recess 690 when ratchet assembly 614 is assembled. Pawl 664 further includes rear angled surface 732 extending away from front side surface 730 toward the rear portion of pawl 664 where upper pawl body 719 is located. Rear angled surface 732 at least partially faces and engages surface 736 of pawl housing recess 690 when ratchet assembly 614 is assembled. Surface 736 connects to angled surface 734 to define an angle that generally corresponds to the angle between front side surface 730 and rear angled surface 732 of pawl 664.

Figure 31:
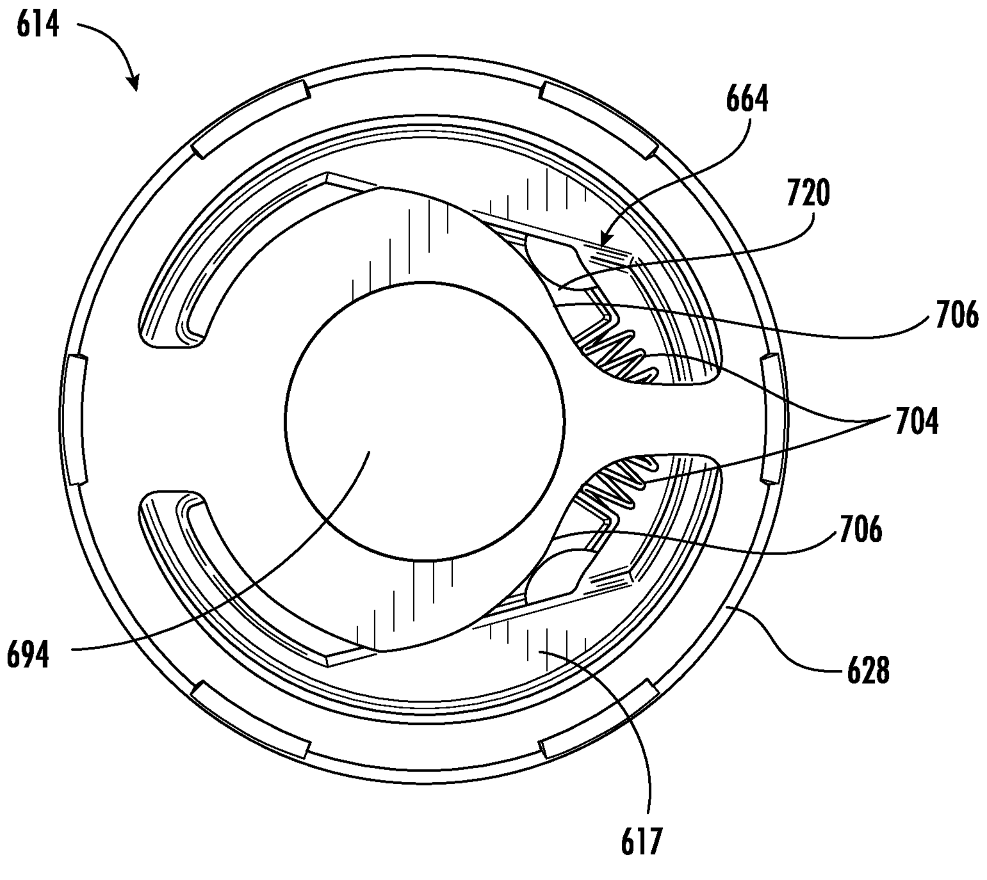
FIG. 31 is a plan view of the ratchet assembly of FIG. 27 in a locked position, according to an exemplary embodiment.
Figure 32:
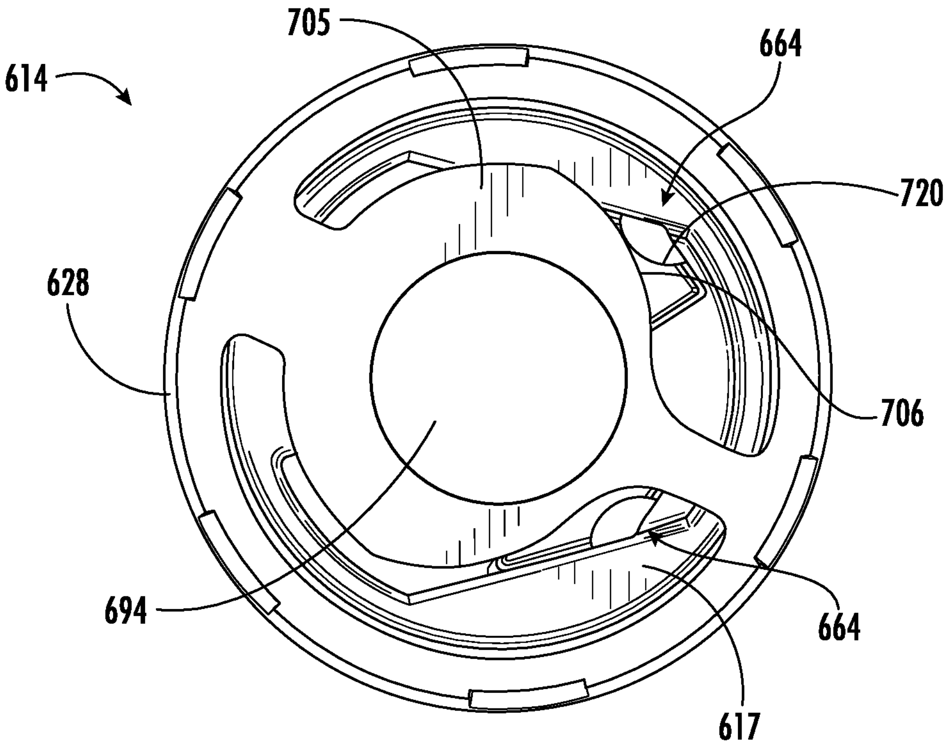
FIG. 32 is a plan view of the ratchet assembly of FIG. 27 when the ratchet knob is turned clockwise, according to an exemplary embodiment.
Figure 33:
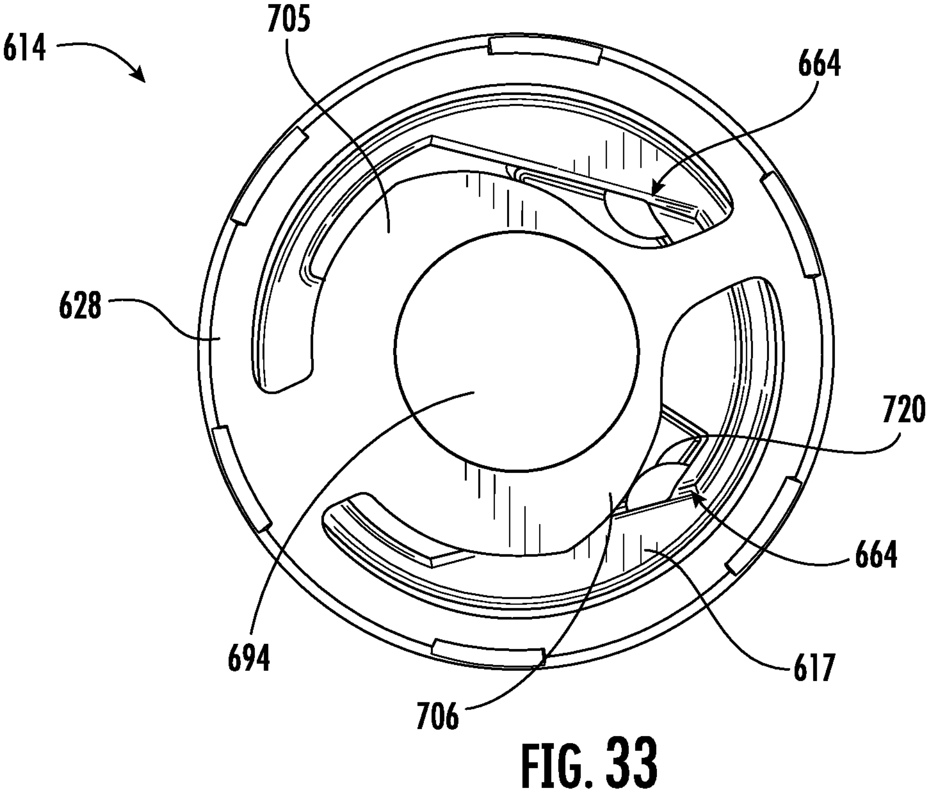
FIG. 33 is a plan view of the ratchet assembly of FIG. 27 when the ratchet knob is turned counterclockwise, according to an exemplary embodiment.

Referring to FIGS. 31-33, plan views showing the pawls in a locked position, a first, engaged position and a second, disengaged position are shown, according to an exemplary embodiment. Referring to FIG. 31, when ball 702 of locking mechanism 670 is positioned within the middle or center knob recess 712, neither cam surface 706 is pressed against the pawls 664 or their pawl cam surfaces 720, meaning both sets of pawl teeth 725 are engaged with gear teeth 695 locking the ratchet assembly 614. Spring 704 extends between and couples to the respective biasing recess 728 of each pawl 664.

Referring to FIGS. 32-33, plan views showing ratchet knob 628 turned clockwise and counterclockwise respectively, with spring 704 removed are shown, according to exemplary embodiments. When a user turns knob 628 in the clockwise direction (see e.g., FIG. 32), ball 702 becomes engaged with one of the outside knob recesses 712 and one of the cam surfaces 706 of cam structure 705 pushes against one pawl 664, meaning that one pawl 664 becomes disengaged allowing the gear and shank to turn in a clockwise direction. Similarly, when a user turns knob 628 in the counterclockwise direction (see e.g., FIG. 33), ball 702 becomes engaged with the opposing outside knob recess 712 and the other (opposite pawl of turning clockwise) pawl 664 becomes disengaged allowing the gear and shank to turn in a counterclockwise direction.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

What is claimed is:

1. A driving tool comprising:

a handle comprising:

a first end;

a second end opposing the first end; and a body portion configured to hold a plurality of tool bits;

a shank coupled to the handle, the shank including a first end and a second end and extending along a longitudinal axis extending from the first end of the shank to the second end of the shank; and a ratchet assembly comprising:

a knob coupled to the handle, the knob including:

a radially inward facing surface;

a wall spaced from the radially inward facing surface, said wall extending axially along said longitudinal axis; and a first cam structure and a second cam structure extending from the wall;

a gear including a plurality of gear teeth and coupled to the shank; a pawl housing at least partially received within the first end of the handle; and a first pawl and a second pawl, the first pawl and second pawl each positioned within the pawl housing and including a plurality of pawl teeth facing the gear;

wherein the knob is rotatable about the longitudinal axis and wherein, when the knob is in a locked position, the ratchet assembly is locked such that shank does not rotate;

wherein, when the knob is turned from the locked position in a clockwise direction to a first unlocked position, the ratchet assembly allows the shank to rotate in the clockwise direction and wherein, when the knob is turned in a counterclockwise direction to a second unlocked position, the ratchet assembly allows the shank to rotate in the counterclockwise direction.

2. The driving tool of claim 1, wherein, when the knob is in the locked position, the first cam structure is spaced from the first pawl and the second cam structure is spaced from the second pawl such that the pawl teeth are engaged with the gear teeth locking the ratchet assembly.

3. The driving tool of claim 1, wherein, when the knob is in the first unlocked position, the first cam structure moves the first pawl such that the pawl teeth of the first pawl are disengaged from the gear teeth, allowing the shank to rotate in the clockwise direction.

4. The driving tool of claim 1, wherein, when the knob is in the second unlocked position, the second cam structure moves the second pawl such that the pawl teeth of the second pawl are disengaged from the gear teeth, allowing the shank to rotate in the counterclockwise direction.

5. The driving tool of claim 1, wherein the first pawl and the second pawl move in a translational manner as the first cam structure and second cam structure engage with the first pawl and the second pawl.

6. The driving tool of claim 1, wherein the handle further comprises:

a bore that surrounds a neck portion that slidably moves between a closed position where the plurality of tool bits are enclosed within the handle and an open position where the plurality of tool bits are positioned outside of the body portion of the handle; and a stabilizing component coupled to the neck portion configured to engage with the bore of the handle to decrease movement of the neck when the handle is moved or extended in the open position.

7. The driving tool of claim 6, wherein the stabilizing component further comprises arms, each arm including a radially outward facing surface configured to engage with the bore of the handle.

8. The driving tool of claim 1, wherein the plurality of gear teeth are radially outward facing on an outer surface of the gear and wherein the plurality of pawl teeth of the first pawl and second pawl extending radially inward.

9. A screwdriver comprising:

a handle comprising:

a first end;

a second end opposing the first end; and a body portion configured to hold a plurality of tool bits;

a shank coupled to the handle, the shank including a first end and a second end, the second end of the shank including a bore;

a longitudinal axis extending along the shank; and a ratchet assembly positioned between the first end of the shank and the second end of the shank, the ratchet assembly comprising:

a pawl housing at least partially received within the first end of the handle;

a switch coupled to the handle, the switch including;

a radial surface;

an annular wall spaced from the radial surface, the annular wall extending axially along said longitudinal axis toward the pawl housing; and a first cam structure and a second cam structure, the first and second cam structures extending downward from the annular wall toward the pawl housing;

a gear including a plurality of gear teeth and coupled to the shank; and a first pawl and a second pawl, the first and second pawl each positioned within the pawl housing and including a plurality of pawl teeth configured to engage the gear teeth of the gear;

wherein the first cam structure is configured to engage the first pawl and the second cam structure is configured to engage the second pawl.

10. The screwdriver of claim 9, wherein the switch is rotatable about the longitudinal axis such that when the switch is turned in an engagement direction the ratchet assembly will drive in the engagement direction.

11. The screwdriver of claim 9, wherein the first pawl and the second pawl move in a translational manner as the first cam structure and second cam structure engage with the first pawl and the second pawl.

12. The screwdriver of claim 11, wherein a first biasing component biases the first pawl, and a second biasing component biases the second pawl, and wherein the first biasing component is aligned with the second biasing component defining a pawl translation axis.

13. The screwdriver of claim 9, the switch further including a plurality of switch recesses, each switch recess including an inward facing engagement surface.

14. The screwdriver of claim 13, wherein the pawl housing further includes an outer surface with a bore extending in a generally perpendicular direction to the longitudinal axis, wherein the ratchet assembly further includes a locking mechanism, the locking mechanism comprising:

a spring element received within the bore of the pawl housing; and a ball configured to engage with the switch such that when the respective switch recess is positioned in front of the locking mechanism, the ball engages the inward facing engagement surface of the switch recess to resist rotation of the switch.

15. The screwdriver of claim 9, wherein the handle further comprises:

a neck portion;

a bore that surrounds the neck portion; and a stabilizing component coupled to the neck portion and configured to engage with the bore of the handle;

wherein the neck portion slidably moves between a closed position where the plurality of tool bits are enclosed within the handle and an open position where the plurality of tool bits are positioned outside of the body portion of the handle.

16. The A driving tool comprising:

a handle comprising:

a first end;

a second end opposing the first end; and a body portion configured to hold a plurality of tool bits;

a shank coupled to the handle, the shank including a first end and a second end and extending along a longitudinal axis extending from the first end of the shank to the second end of the shank; and a ratchet assembly positioned between the first end of the shank and the second end of the shank, the ratchet assembly comprising:

a switch coupled to the handle, the switch including;

a radially inward facing surface;

a wall, said wall extending axially along said longitudinal axis;

an annular recess defined between the radially inward facing surface and the wall; and a cam structure positioned on the wall;

a gear including a plurality of gear teeth and coupled to the shank;

a pawl housing including a recess and a bore, the bore extending along the longitudinal axis, the pawl housing at least partially received within the first end of the handle; and a first pawl and a second pawl each positioned within the recess of the pawl housing, the first pawl and second pawl each include:

a plurality of pawl teeth, the plurality of pawl teeth configured to engage the gear teeth;

an upper pawl body extending toward the switch, the upper pawl body including a pawl cam surface;

wherein the switch is rotatable about the longitudinal axis and wherein the cam structure of the switch extends toward the pawl housing such that when the switch rotates about the longitudinal axis, the cam structure moves to interface with the pawl cam surface of the first pawl or the second pawl.

17. The driving tool of claim 16, wherein the ratchet assembly further includes a biasing element positioned within the recess of the pawl housing, the biasing element includes a first end coupled to the first pawl and a second end coupled to the second pawl.

18. The driving tool of claim 16, wherein the cam structure is coupled to the switch along an inner surface at a first position and at a second position that opposes the first position, the cam structure further including a pair of opposing cam surfaces extending downward along the longitudinal axis of the shank, the pair of opposing cam surfaces configured to engage the pawl cam surfaces of the first pawl and the second pawl.

19. The driving tool of claim 18, the ratchet assembly further including a locking mechanism, the locking mechanism comprising:

a plurality of switch recesses positioned along the inner surface of the switch, each switch recess including an inward facing engagement surface;

a spring element received within a bore on an outer surface of the pawl housing; and a ball positioned to engage with the spring element on a first side and configured to engage with the switch on a second side such that when the respective switch recess is positioned in front of the second side of the ball, the ball engages the inward facing engagement surface of the switch recess to resist rotation of the switch.

20. The driving tool of claim 16, the handle further comprising:

a neck portion;

a bore defined within the body portion and surrounding the neck portion; and a stabilizing component coupled to the neck portion and configured to engage with the bore of the handle;

wherein the neck portion slidably moves between a first position where the plurality of tool bits are enclosed within the handle and a second position where the plurality of tool bits are positioned outside of the body portion of the handle.

* * * * *